(12) United States Patent
Yamada

(10) Patent No.: US 8,720,796 B2
(45) Date of Patent: May 13, 2014

(54) ROTARY ATOMIZING HEAD TYPE COATING DEVICE

(75) Inventor: Yukio Yamada, Fujieda (JP)

(73) Assignee: ABB K.K., Tokyo (JP)

( * ) Notice: Subject to any disclaimer, the term of this patent is extended or adjusted under 35 U.S.C. 154(b) by 928 days.

(21) Appl. No.: 12/811,127

(22) PCT Filed: May 21, 2009

(86) PCT No.: PCT/JP2009/059353
§ 371 (c)(1),
(2), (4) Date: Jun. 29, 2010

(87) PCT Pub. No.: WO2009/154056
PCT Pub. Date: Dec. 23, 2009

(65) Prior Publication Data
US 2010/0282865 A1    Nov. 11, 2010

(30) Foreign Application Priority Data
Jun. 16, 2008    (JP) ................................. 2008-156581

(51) Int. Cl.
*B05B 3/02*    (2006.01)

(52) U.S. Cl.
USPC ................. 239/222.11; 239/223; 239/222.15; 239/289; 239/224

(58) Field of Classification Search
USPC ................. 239/224, 223, 222.11, 222.15, 289
See application file for complete search history.

(56) References Cited

U.S. PATENT DOCUMENTS

| | | | |
|---|---|---|---|
| 5,685,495 A | 11/1997 | Pham et al. | |
| 6,557,781 B2 * | 5/2003 | Kon | 239/224 |
| 2001/0015386 A1 | 8/2001 | Pruss | |
| 2003/0010841 A1 * | 1/2003 | Kon | 239/224 |
| 2003/0075617 A1 | 4/2003 | Baumann et al. | |
| 2005/0077384 A1 | 4/2005 | Tani et al. | |
| 2007/0104535 A1 * | 5/2007 | Valovick | 403/359.1 |

FOREIGN PATENT DOCUMENTS

| | | | |
|---|---|---|---|
| EP | 1 514 605 A2 | 3/2005 | |
| GB | 2 321 945 A | 8/1998 | |
| JP | 4 71656 | 3/1992 | |
| JP | 8 503416 | 4/1996 | |
| JP | 11 28391 | 2/1999 | |
| JP | 11-028391 * | 2/1999 | B05B 3/10 |
| JP | 2002 166199 | 6/2002 | |
| JP | 2002 224593 | 8/2002 | |
| JP | 2002 248382 | 9/2002 | |
| JP | 2003 524523 | 8/2003 | |
| WO | WO 2004/030828 A1 | 4/2004 | |

OTHER PUBLICATIONS

Extended European Search Report issued Oct. 25, 2011 in patent application No. 09766504.6.

* cited by examiner

*Primary Examiner* — Jason J Boeckmann
*Assistant Examiner* — Joel Zhou
(74) *Attorney, Agent, or Firm* — Oblon, Spivak, McClelland, Maier & Neustadt, L.L.P.

(57) ABSTRACT

A rotation restricting mechanism is provided between a mounting shaft section of a rotational shaft and a mounting tube section of a rotary atomizing head. The rotation restricting mechanism includes a male spline member provided on the outer peripheral side of the mounting shaft section, and a female spline member provided on the inner peripheral side of the mounting tube section. By meshing engagement of the male spline member with the female spline member, the rotation restricting mechanism restricts rotational displacements of the rotary atomizing head relative to the rotational shaft.

5 Claims, 26 Drawing Sheets

ROTARY ATOMIZING HEAD TYPE COATING DEVICE

TECHNICAL FIELD

This invention relates to a rotary atomizing head type coating device which is suitable for use in painting work objects such as vehicle bodies and the like.

BACKGROUND ART

Generally, as a coating device for painting work objects like vehicle bodies, rotary atomizing head type coating devices have been well known in the art (e.g., see Patent Literature 1: Japanese Patent Laid-Open No. 2002-248382, Patent Literature 2: Japanese Patent Laid-Open No. Hei 4-71656, Patent Literature 3: U.S. Patent Application Publication No. 2003/0075617, Patent Literature 4: Japanese Patent Application National Publication No. Hei 8-503416, Patent Literature 5: Japanese Patent Laid-Open No. Hei 11-28391). In this connection, disclosed in Patent Literatures 1 to 3 are arrangements in which a rotary atomizing head is mounted on a fore distal end of a rotational shaft which is put in rotation, for example, by an air motor. In this instance, a mounting shaft section having a male screw is formed at a fore distal end of the rotational shaft, while a mounting tube section having a female screw is formed at a rear portion side of the rotary atomizing head. The rotary atomizing head is mounted on the rotational shaft by threading the female screw of the mounting tube section onto the male screw on the mounting shaft section.

Disclosed in Patent Literature 4 is a mechanism for mounting a rotary atomizing head on a rotational shaft, employing an annular resilient coupling member on the back side of a rotary atomizing head, the resilient coupling member having a plural number of fitting rings along its circumference, each fitting ring being formed with a ball-shaped projecting portion at a fore distal end thereof for engagement with a groove on the part of the rotational shaft. In this case, when the rotational shaft is put in rotation, a fore distal end of the resilient coupling member is spread out in a radial direction under centrifugal force to hold the rotary atomizing head on the rotational shaft with an increased clamping force, while automatically bringing the rotary atomizing head and the rotational shaft into alignment with each other.

Further, disclosed in Patent Literature 5 is a mechanism for mounting a rotary atomizing head on a rotational shaft, by way of an annular groove which is provided along the inner peripheral surface of a mounting tube section of the rotary atomizing head, for engagement with an O-ring which is provided on the outer peripheral surface of a mounting shaft section of the rotational shaft. Furthermore, FIG. 8, and the like of Patent Literature 5 show arrangements in which a mounting shaft section of the rotational shaft is provided with a tapered portion gradually tapered off toward the fore distal end, and the mounting tube section of the rotary atomizing head is provided with an inclined inner peripheral surface which is gradually spread toward its opening side in correspondence with outer peripheral surface of the tapered portion. In this instance, the rotational center of the rotary atomizing head is automatically aligned with that of the rotational shaft by pushing the inclined inner peripheral surface of the rotary atomizing head into the inclined inner peripheral surface of the rotational shaft.

By the way, in the case of a rotary atomizing head type coating device which is adapted to mount a rotary atomizing head on a rotational shaft by means of screw threads, arrangements are made such that the screw threads are tightened by rotating a rotary atomizing head in a direction inverse to the direction of rotation of a motor, for the purpose of preventing dislodgement of the rotary atomizing head off the rotational shaft under the influence of rotation of the motor. Accordingly, as the rotational speed of a motor is increased, a rotational torque is applied in such a direction as to hold the rotary atomizing head and rotational shaft to each other with a greater clamping force under the influence of inertial force. However, when the rotational speed of the motor is on decrease, a rotational torque is applied in such a direction as to decrease the force of clamping the rotary atomizing head to the rotational shaft. Therefore, when the rotational speed of the motor is dropped abruptly in the course of a paint coating operation or at the time of an emergency stop of the motor due to a machine trouble or for other reasons, the screw threads can be loosened to such a degree as to cause dislodgement of the rotary atomizing head off the rotational shaft.

Therefore, in Patent Literature 1 mentioned above, for the purpose of preventing dislodgement of the rotary atomizing head, a projection is provided on the outer peripheral side of the mounting tube section of the rotary atomizing head, and a groove through which the projection of the mounting tube section can be inserted is provided on a shaping air ring which is mounted in such a way as to circumvent the rotary atomizing head, on the front side of the mounting tube section. However, the provision of such a dislodgement preventing mechanism comprised of projections and grooves results in complication in construction, which is reflected by large restrictions in design and a higher production cost.

Further, in a case where a rotary atomizing head is mounted on a rotational shaft through screw threads, it becomes necessary to put the rotational shaft in a rotationally locked state at the time of mounting or dismantling the rotary atomizing head. In this regard, Patent Literatures 2 and 3 disclose a rotation preventing mechanism employing a rod-like lock member which is adapted to be inserted from outside into a locking hole which is on a rotational shaft. However, the provision of a rotation preventing mechanism of this sort also invites complication in construction to hinder efforts for reductions in size and manufacturing cost of the coating device.

On the other hand, disclosed in Patent Literature 4 is a coupling mechanism employing a resilient coupling member provided on a rotary atomizing head, the resilient coupling member being provided with a projecting portion to be fitted in a groove of a rotational shaft at the time of mounting the rotary atomizing head on the latter. However, in the case of Patent Literature 4, no consideration is given to rotational displacements of the rotary atomizing head relative to the rotational shaft. In addition, the rotary atomizing head is clamped to the rotational shaft only at a point between the projecting portion of the resilient coupling member and the groove of the rotational shaft.

Therefore, the coating device of Patent Literature 4 is unable to stably fix the rotary atomizing head relative to the rotational shaft and as a result may suffer from a problem of misalignment (deviation) of a center axis of the rotary atomizing head relative to that of the rotational shaft during rotation. In such a case, it is likely for the rotational shaft, which is rotatably supported by an air bearing of an air motor, to be damaged to a serious degree by contact with the air bearing.

Furthermore, disclosed in Patent Literature 5 are arrangements in which an O-ring provided on the outer peripheral side of a rotational shaft is brought into engagement with an annular groove of a rotary atomizing head, thereby pushing an inclined inner peripheral surface of the rotary atomizing head against an inclined inner peripheral surface of the rotational shaft. However, Patent Literature 5 also fails to give consideration to rotational displacements of the rotary atomizing head relative to the rotational shaft.

Therefore, in Patent Literature 5, when the rotational speed of an air motor is increased or decreased, a follow-up delay may occur to the rotary atomizing head, as a result of a failure in following up the speed of the rotational shaft under the influence of inertial force acting on the rotary atomizing head. In case a follow-up delay of this sort takes place at the time of increasing the rotational speed of an air motor to a specified speed, the rotational speed of the rotary atomizing head reaches the specified speed with a delay in time from the rotational speed of the air motor. On the other hand, at the time of decreasing the rotational speed of the air motor to a specified speed, the rotary atomizing head causes a delay to the air motor in reaching the specified speed. As a consequence, in a paint coating operation which requires varying the rotational speed of the air motor, it becomes difficult to atomize paint particles quickly in a desired size, failing to prevent degradations in quality of coatings.

DISCLOSURE OF THE INVENTION

In view of the above-discussed problems with the prior art, it is an object of the present invention to provide a rotary atomizing head type coating device which permits to mount a rotary atomizing head on a rotational shaft without using screw threads, while preventing displacements in rotational direction of the rotary atomizing head relative to the rotational shaft, which might otherwise take place upon increasing or decreasing rotational speed.

(1) In order to solve the above-discussed problems, the present invention is applied to a rotary atomizing head type coating device comprising: a rotational shaft adapted to be put in rotation by a motor and provided with a mounting shaft section at a fore distal end thereof, and a rotary atomizing head whose front portion is formed in a bell- or cup-shape and whose rear portion is a mounting tube section mounted on an outer peripheral side of the mounting shaft section of the rotational shaft.

The rotary atomizing head type coating device according to the invention is characterized in that: a rotation restricting mechanism which is adapted to restrict rotational movements of the rotary atomizing head in the rotational direction relative to the rotational shaft is provided between the mounting shaft section of the rotational shaft and the mounting tube section of the rotary atomizing head; and the rotation restricting mechanism is constituted by a male spline comprised of a plural number of spline teeth provided on the outer peripheral side of the mounting shaft section of the rotational shaft and extending in the axial direction, and a female spline comprised of a plural number of spline teeth provided on the inner peripheral side of the mounting tube section of the rotary atomizing head and extending in the axial direction for meshing engagement with the spline teeth.

According to the present invention, a rotation restricting mechanism is provided between a mounting shaft section of a rotational shaft and a mounting tube section of a rotary atomizing head thereby to restrict rotational deviations which would otherwise occur between the rotary atomizing head and the rotational shaft. Therefore, irrespective of an increase or decrease in rotational speed, the rotary atomizing head is rotated integrally with the rotational shaft and stably fixed to the latter. Thus, the state in which the center axis of the rotary atomizing head is aligned with the center axis of the rotational shaft is kept to prevent damages to the rotational shaft and the like and at the same time to enhance reliability and durability of the machine.

In addition, since a rotary atomizing head is put in rotation integrally with a rotational shaft irrespective of an increase or decrease in rotational speed, it is possible to prevent a follow-up delay between the rotary atomizing head and the rotational shaft. This means that, in a case where it is required to vary the rotational speed of the rotational shaft during a paint coating operation, for example, paint particles can be atomized quickly to a desired size in response to a change in rotational speed to enhance quality of coatings.

Further, the rotation restricting mechanism is constituted by a male spline which is provided on the outer peripheral side of a mounting shaft section of a rotational shaft, and a female spline which is provided on the inner peripheral side of a mounting tube section of a rotary atomizing head. Therefore, the rotary atomizing head can be fixedly mounted in position on the rotational shaft by coupling the male and female splines with each other. Thus, the rotary atomizing head can be mounted on the rotational shaft without use of screw threads, namely, the rotary atomizing head can be mounted on the rotational shaft with a higher degree of stability, precluding the possibility of dislodgement of the rotary atomizing head off the rotational shaft due to loosening of screw threads.

(2) According to the invention, an axial displacement restricting mechanism which is adapted to restrict displacements of the rotary atomizing head in the axial direction relative to the rotational shaft is provided between the mounting shaft section of the rotational shaft and the mounting tube section of the rotary atomizing head.

With the arrangements just described, axial displacements of the rotary atomizing head relative to the rotational shaft can be restricted by the use of the axial displacement restricting mechanism, preventing dislodgement of the rotary atomizing head in an assured manner.

In this instance, the axial displacement restricting mechanism may be arranged to utilize an axial frictional resistance which occurs between male and female spline teeth. If arranged in such a way, the male and female splines can perform dual functions of the rotation restricting mechanism and of the axial displacement restricting mechanism. Therefore, as compared with a case where a rotation restricting mechanism and an axial displacement restricting mechanism are provided separately from each other, it becomes possible to downsize the mounting shaft section of the rotational shaft and the mounting tube section of the rotary atomizing head into a compact form, respectively.

Otherwise, the axial displacement restricting mechanism may be constituted by a resilient ring which is fitted on the side of either the mounting shaft section of the rotational shaft or the mounting tube section of the rotary atomizing head. In a case where a resilient ring is provided on the mounting shaft section of the rotational shaft, for example, it is resiliently contacted with an inner peripheral surface of the mounting tube section of the rotary atomizing head to prevent axial displacement of the rotary atomizing head relative to the rotational shaft.

Alternatively, the axial displacement restricting mechanism may be constituted by first and second magnetic members which are provided on the mounting shaft section of the rotational shaft and on the mounting tube section of the rotary atomizing head, respectively. In this case, the first and second magnetic members are attracted toward each other by magnetic force to prevent axial displacements of the rotary atomizing head relative to the rotational shaft.

(3) According to the invention, the axial displacement restricting mechanism is constituted by radially and outwardly displaceable coupling members provided on the outer peripheral side of the mounting shaft section of the rotational shaft, and a circumferentially extending fitting groove provided on the inner peripheral side of the mounting tube section of the rotary atomizing head in such a way as to permit intrusion and fitting of the coupling members. With the arrangements just described, axial displacements of the rotary atomizing head relative to the rotational shaft can be restricted by intrusion of the coupling member into the fitting groove.

(4) According to the present invention, an axial aligning mechanism which is adapted to push an inner peripheral surface of the rotary atomizing head against an outer peripheral surface of the rotational shaft to bring a center axis of the rotary atomizing head into alignment with a center axis of the rotational shaft when the rotary atomizing head is put in rotation is provided between the mounting shaft section of the rotational shaft and the mounting tube section of the rotary atomizing head.

With the arrangements just described, the axial aligning mechanism is adapted to push an inner peripheral surface of the rotary atomizing head against an outer peripheral surface of the rotational shaft, for example, through utilization of centrifugal force by rotation, thereby to bring a center axis of the rotary atomizing head into alignment with a center axis of the rotational shaft.

In this connection, it is preferable to provide an inclined outer peripheral surface on the outer peripheral surface of the mounting shaft section of the rotational shaft and to provide an inclined inner peripheral surface corresponding to the inclined outer peripheral surface on the inner peripheral surface of the mounting tube section of the rotary atomizing head. In this case, by axially biasing the rotary atomizing head in a direction toward a base end of the rotational shaft, the inclined inner peripheral surface of the rotary atomizing head is abutted against the inclined outer peripheral surface of the rotational shaft to align a center axis of the rotary atomizing head with that of the rotational shaft.

(5) According to the invention, the axial aligning mechanism is constituted by an inclined bottom surface provided at the bottom portion of the fitting groove in such a way that the groove depth gets shallower gradually from a deepest portion toward an opening side of the mounting tube section.

With the arrangements just described, as the coupling members are urged to protrude in a radially outward direction, for example, under the influence of centrifugal force by rotation, fore distal ends of the coupling members are abutted against the inclined bottom surface of the fitting groove. Thus, by a component of force which is generated at a point of contact between the coupling members and the inclined bottom surface, the rotary atomizing head can be biased in a direction toward a base end of the rotational shaft. Therefore, the inner peripheral surface of the rotary atomizing head is biased toward the outer peripheral surface of the rotational shaft to bring a center axis of the rotary atomizing head into alignment with that of the rotational shaft.

In this regard, each coupling member may be associated with a spring member which is adapted to bias in a radially outward direction. In this instance, no matter whether the rotational shaft is in rotation or not, a fore distal end of each coupling member is urged to intrude into the fitting groove. Accordingly, at the time of mounting the rotary atomizing head on the rotational shaft, the coupling members can be fitted into the fitting groove in a more assured manner to fix the rotary atomizing head in a retained state.

Alternatively, arrangements may be made such that the coupling members and fitting groove are attracted to each other by magnetic force. In this instance, each coupling member can be shifted toward the fitting groove by magnetic force. Thus, no matter whether the rotational shaft is in rotation or not, a fore distal end of each coupling member can be urged to intrude into the fitting groove. Accordingly, at the time of mounting the rotary atomizing head on the rotational shaft, the coupling members can be fitted into the fitting groove in a more assured manner to fix the rotary atomizing head in a retained state.

Further, each one of the coupling members may be constituted by a coupling projection whose fore distal end is protrusibly mounted on the mounting shaft section of the rotational shaft. In this instance, by intrusion of the fore distal ends of the coupling projections into the fitting groove, they are engaged with each other.

Otherwise, each one of the coupling members may be in the form of a coupling ball which is protrusibly mounted on the mounting shaft section of the rotational shaft. In this instance, by intrusion of a protruded portion of the coupling ball into the fitting groove, the coupling projections and the fitting groove are engaged with each other.

(6) Further, according to the invention, the rotary atomizing head type coating device is characterized in that: a rotation restricting mechanism which is adapted to restrict rotational movements of the rotary atomizing head in the rotational direction relative to the rotational shaft is provided between the mounting shaft section of the rotational shaft and the mounting tube section of the rotary atomizing head; an axial displacement restricting mechanism which is adapted to restrict displacements of the rotary atomizing head in the axial direction relative to the rotational shaft is provided between the mounting shaft section of the rotational shaft and the mounting tube section of the rotary atomizing head; and the rotation restricting mechanism and the axial displacement restricting mechanism are constituted by one or a plural number of radially and outwardly displaceable coupling members provided on the outer peripheral side of the mounting shaft section of the rotational shaft, and fitting portions which are comprised of a plural number of independent grooves formed in series around the inner peripheral side of the mounting tube section of the rotary atomizing head and permit fitting of the coupling members in a fixed state relative to both axial and rotational directions when the coupling members intrude into the fitting portions.

According to the present invention, a rotation restricting mechanism is provided between the mounting shaft section of the rotational shaft and the mounting tube section of the rotary atomizing head thereby to restrict rotational deviations which would occur between the rotary atomizing head and the rotational shaft. Therefore, despite an increase or decrease of rotational speed, the rotary atomizing head is rotated integrally with the rotational shaft and stably fixed to the latter, preventing a follow-up delay between the rotational shaft and the rotary atomizing head.

Besides, by means of an axial displacement restricting mechanism, axial displacements of the rotary atomizing head relative to the rotational shaft can be restricted to prevent the dislodgement of the rotary atomizing head in an assured manner.

The rotation restricting mechanism and the axial displacement restricting mechanism are constituted by coupling members which are provided on the outer peripheral side of the mounting shaft section of the rotational shaft, and a fitting portion comprised of a plural number of independent grooves which are formed in series around the inner peripheral side of the mounting tube section of the rotary atomizing head. By fitting the coupling members in the independent grooves of the fitting portion, the rotary atomizing head can be mounted on the rotational shaft. Thus, the rotary atomizing head can be mounted in position on the rotational shaft without using screw threads, while insuring higher stability of the rotary atomizing head on the rotational shaft.

Further, by intrusion of the coupling members into the independent grooves of the fitting portion, the rotary atomizing head is restricted of displacements in both axial and rotational directions relative to the rotational shaft. Thus, the coupling members as well as fitting portions can perform dual functions of the rotation restricting mechanism and the axial displacement restricting mechanism. Therefore, as compared with a case where a rotation restricting mechanism and an axial displacement restricting mechanism are provided separately from each other, the mounting shaft section of the rotational shaft and the mounting tube section of the rotary atomizing head can be downsized to a more compact form.

(7) In this instance, according to the invention, an axial aligning mechanism which is adapted to push an inner peripheral surface of the rotary atomizing head against an outer peripheral surface of the rotational shaft to bring a center axis of the rotary atomizing head into alignment with a center axis of the rotational shaft when the rotary atomizing head is put in rotation is provided between the mounting shaft section of the rotational shaft and the mounting tube section of the rotary atomizing head.

Thus, in a case where an inclined outer peripheral surface is provided, for example, on the outer peripheral surface of the mounting shaft section of the rotational shaft and an inclined inner peripheral surface is provided on the inner peripheral surface of the mounting tube section of the rotary atomizing head, the axial aligning mechanism is adapted to push the inclined inner peripheral surface of the rotary atomizing head against the inclined outer peripheral surface of the rotational shaft, thereby to bring a center axis of the rotary atomizing head into alignment with a center axis of the rotational shaft.

(8) According to the invention, the axial aligning mechanism is constituted by inclined bottom surfaces provided at the bottom portion of the independent grooves of the fitting portions in such a way that the groove depths get shallower gradually from a deepest portion toward an opening side of the mounting tube section.

With the arrangements just described, fore distal ends of the coupling members are abutted against the inclined bottom surfaces of the independent grooves as the coupling members are urged to protrude in a radially outward direction, for example, under the influence of centrifugal force by rotation. Thus, by a component of force which is generated at a point of contact between each coupling member and the inclined bottom surface, the rotary atomizing head is biased in a direction toward the base end of the rotational shaft. Therefore, the inner peripheral surface of the rotary atomizing head is pushed against the outer peripheral surface of the rotational shaft to bring the center axis of the rotary atomizing head into alignment with that of the rotational shaft.

(9) Further, according to the present invention, the rotary atomizing head type coating device is characterized in that: a rotation restricting mechanism which is adapted to restrict rotational movements of the rotary atomizing head in the rotational direction relative to the rotational shaft is provided between the mounting shaft section of the rotational shaft and the mounting tube section of the rotary atomizing head; an axial displacement restricting mechanism which is adapted to restrict displacements of the rotary atomizing head in the axial direction relative to the rotational shaft is provided between the mounting shaft section of the rotational shaft and the mounting tube section of the rotary atomizing head; and the rotation restricting mechanism and axial displacement restricting mechanism are constituted by arm members provided on the outer peripheral side of the mounting shaft section of the rotational shaft and provided with free ends at fore distal ends thereof to be flexible in the radial direction, claw members provided on fore distal ends of the arm members and projected toward the radially outward direction, and fitting portions which are comprised of a plural number of independent grooves formed in series around the inner peripheral side of the mounting tube section of the rotary atomizing head and permit fitting of the claw members in a fixed state relative to both axial and rotational directions when the claw members intrude into the fitting portions.

With the arrangements just described, rotational deviations between the rotary atomizing head and the rotational shaft can be restricted by the use of the rotation restricting mechanism. Therefore, despite an increase or decrease in rotational speed, the rotary atomizing head is rotated integrally with the rotational shaft and stably fixed to the latter, preventing a follow-up a delay between the rotational shaft and the rotary atomizing head.

Further, since the axial displacement restricting mechanism is provided between the mounting shaft section of the rotational shaft and the mounting tube section of the rotary atomizing head, axial displacements of the rotary atomizing head relative to the rotational shaft can be restricted by the use of the axial displacement restricting mechanism to prevent dislodgement of the rotary atomizing head in an assured manner.

Further, in this case, the rotation restricting mechanism and axial displacement restricting mechanism are constituted by arm members which are provided on the outer peripheral side of the mounting shaft section of the rotational shaft, claw members which are provided on fore distal ends of the arms, and a fitting portion comprised of a plural number of independent grooves which are formed in series around the inner peripheral side of the mounting tube section of the rotary atomizing head. Therefore, the rotary atomizing head can be mounted on the rotational shaft by fitting the claw members in the independent grooves of the fitting portions. That is to say, the rotary atomizing head can be mounted on the rotational shaft without using screw threads, and fixed in position with higher stability.

Further, by intrusion of the claw members into the independent grooves of the fitting portion, displacements of the rotary atomizing head in both axial and rotational directions relative to the rotational shaft are restricted. Thus, the claw members and the fitting portion are arranged to perform dual functions of the rotation restricting mechanism and of the axial displacement restricting mechanism. Therefore, as compared with a case where a rotation restricting mechanism and an axial displacement restricting mechanism are provided separately from each other, the mounting shaft section of the rotational shaft and the mounting tube section of the rotary atomizing head can be downsized to a more compact form.

(10) According to the invention, an axial aligning mechanism which is adapted to push an inner peripheral surface of the rotary atomizing head against an outer peripheral surface of the rotational shaft to bring a center axis of the rotary atomizing head into alignment with a center axis of the rotational shaft when the rotary atomizing head is put in rotation is provided between the mounting shaft section of the rotational shaft and the mounting tube section of the rotary atomizing head.

Thus, for example, in a case where an inclined outer peripheral surface is provided on the outer peripheral surface of the mounting shaft section of the rotational shaft and an inclined inner peripheral surface is provided on the inner peripheral surface of the mounting tube section of the rotary atomizing head, the axial aligning mechanism is adapted to push the inclined inner peripheral surface of the rotary atomizing head against the inclined outer peripheral surface of the rotational shaft, thereby to bring a center axis of the rotary atomizing head into alignment with a center axis of the rotational shaft.

(11) According to the invention, the axial aligning mechanism is constituted by inclined surfaces provided internally of the independent grooves of the fitting portions in such a way that the groove depths get shallower gradually from a deepest portion toward an opening side of the mounting tube section.

With the arrangements just described, when the claw members are displaced in a radially outward direction, for example, under the influence of centrifugal force by rotation, fore distal ends of the claw members are abutted against the inclined surfaces of the independent grooves, thereby pulling the rotary atomizing head in a direction toward the base end of the rotational shaft. As a consequence, an inner peripheral surface of the rotary atomizing head is pushed against an outer peripheral surface of the rotational shaft to bring a center axis of the rotary atomizing head with that of the rotational shaft.

DESCRIPTION OF REFERENCE NUMERALS

Figure 1:
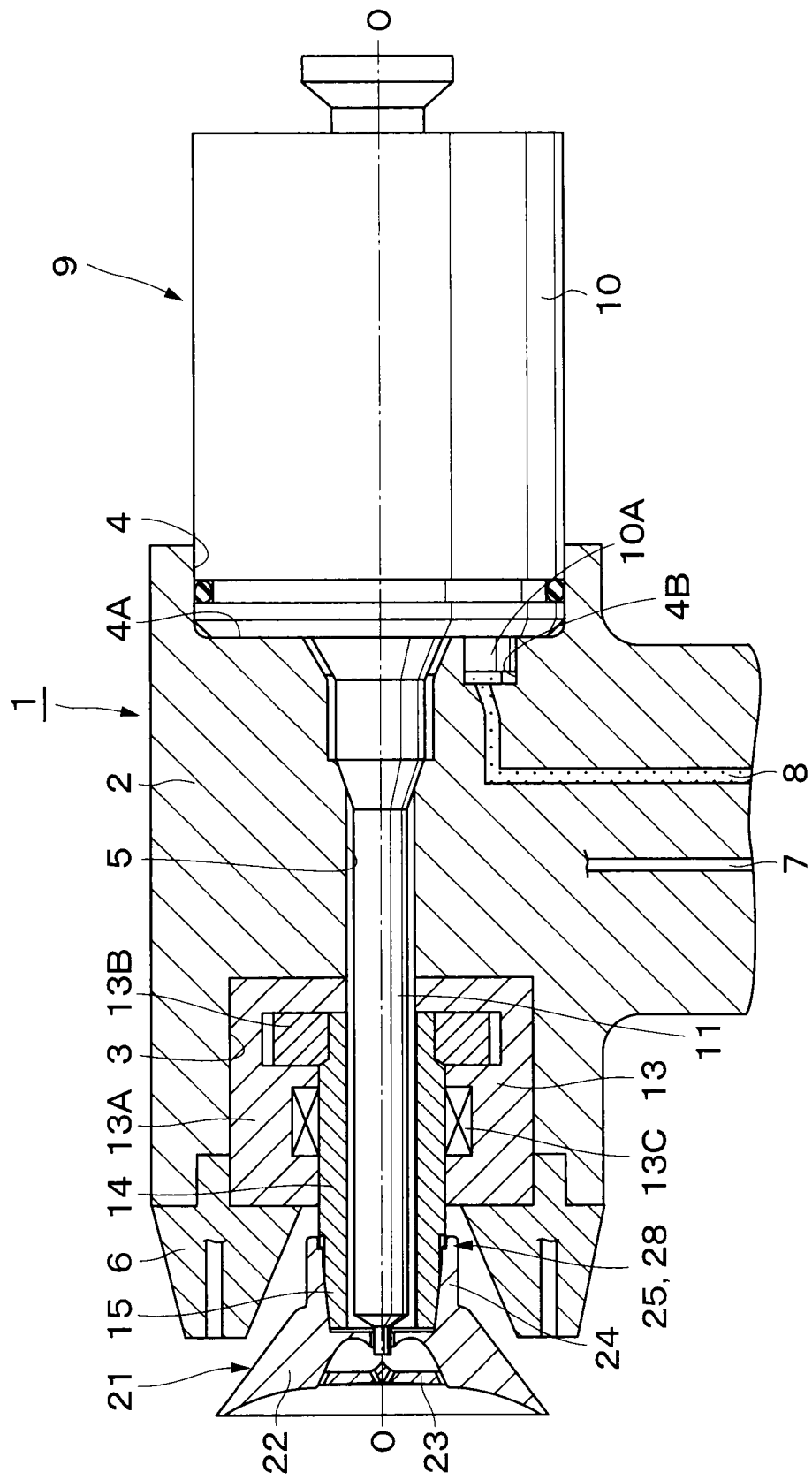
FIG. 1 is a longitudinal sectional view showing a rotary atomizing head type coating device according to a first embodiment in the present invention.

1: Rotary atomizing head type coating device
13: Air motor (motor)
14: Rotational shaft 15: Mounting shaft section
15C: Inclined outer peripheral surface
21: Rotary atomizing head
24: Mounting tube section
24C: Inclined inner peripheral surface
25, 31, 41, 51, 61, 71, 81, 91, 101, 101', 101", 111: Rotation restricting mechanism
26, 32, 42, 52, 62, 72, 82, 92: Male spline member (male spline)
26A, 32A, 42A, 52A, 62A, 72A, 82A, 92A: Spline teeth
27, 33, 43, 53, 63, 73, 83, 93: Female spline member (female spline)
27A, 33A, 43A, 53A, 63A, 73A, 83A, 93A: Spline teeth
28, 34, 44, 54, 64, 74, 84, 94, 94', 94", 102, 102', 102", 112: Axial displacement restricting mechanism
35: Resilient ring
45: First magnetic ring (first magnetic member)
46: Second magnetic ring (second magnetic member)
65, 75, 85, 103, 103', 103": Coupling projection (coupling member)
67, 77, 88, 97, 97": Fitting groove
67A, 77A, 88A, 97A, 97A": Inclined bottom surface
68, 78, 89, 106, 117: Axial aligning mechanism
75C, 103C': First spring member
75D, 103D': Second spring member
95, 95', 95": Coupling ball (coupling member)
95A': Spring member
105, 105", 115: Fitting portion
105A, 105A", 115A: Independent groove
105B: Inclined bottom surface
113: Arm member
114: Claw member
116: Inclined surface

BEST MODE FOR CARRYING OUT THE INVENTION

Hereafter, the rotary atomizing head type coating device on which a rotary atomizing head is mounted according to the present invention is described more particularly by way of its preferred embodiments with reference to the accompanying drawings.

Referring first to FIGS. 1 to 4, there is shown a first embodiment of the present invention. In this embodiment, the invention is described byway of a cartridge type rotary atomizing head type coating device to which a cartridge replenished with a paint of each color is replaceably attached.

Indicated at 1 is a rotary atomizing head type coating device (hereinafter referred to as a coating device 1) which is mounted, for example, on a fore distal end of an arm (not shown) of a coater manipulation robot. This coating device 1 is largely constituted by a housing 2, cartridge 9, air motor 13, rotational shaft 14, rotary atomizing head 21, and the like, which will be described in greater detail hereinafter.

Denoted at 2 is a housing which is attached on a fore distal end of the arm of the coater manipulation robot. The housing 2 is formed with a motor mounting portion 3 and a cartridge mounting portion 4 at its front and rear sides, respectively. Formed at a bottom portion 4A of the cartridge mounting portion 4 is a female coupling portion 4B which constitutes a connecting portion of an extruding thinner. In this instance, a feed tube passage hole 5 is formed internally and longitudinally of the housing 2, through centers of the respective mounting portions 3 and 4. Further, a shaping air ring 6 is attached to the front portion of the housing 2. Shaping air is spurted out from the shaping air ring 6 thereby to control a spray pattern of paint particles which are sprayed by the rotary atomizing head 21, as described in greater detail later on.

Indicated at 7 are a plural number of air passages which are formed in the housing 2 and connected to a control air source (not shown). These air passages 7 supply turbine air for controlling an air motor 13, which will be described hereinafter, bearing air and brake air, in addition to the shaping air which forms a paint spray pattern. In the present embodiment, only one air passage is typically shown in the drawings for the convenience of illustration.

Designated at 8 is an extruding thinner passage of the housing side which is provided on the housing 2. One end of this extruding thinner passage 8 is connected to an extruding thinner feed valve (not shown), while the other end of the passage 8 is opened to a bottom portion of the female coupling portion 4B of the cartridge mounting portion 4.

Figure 2:
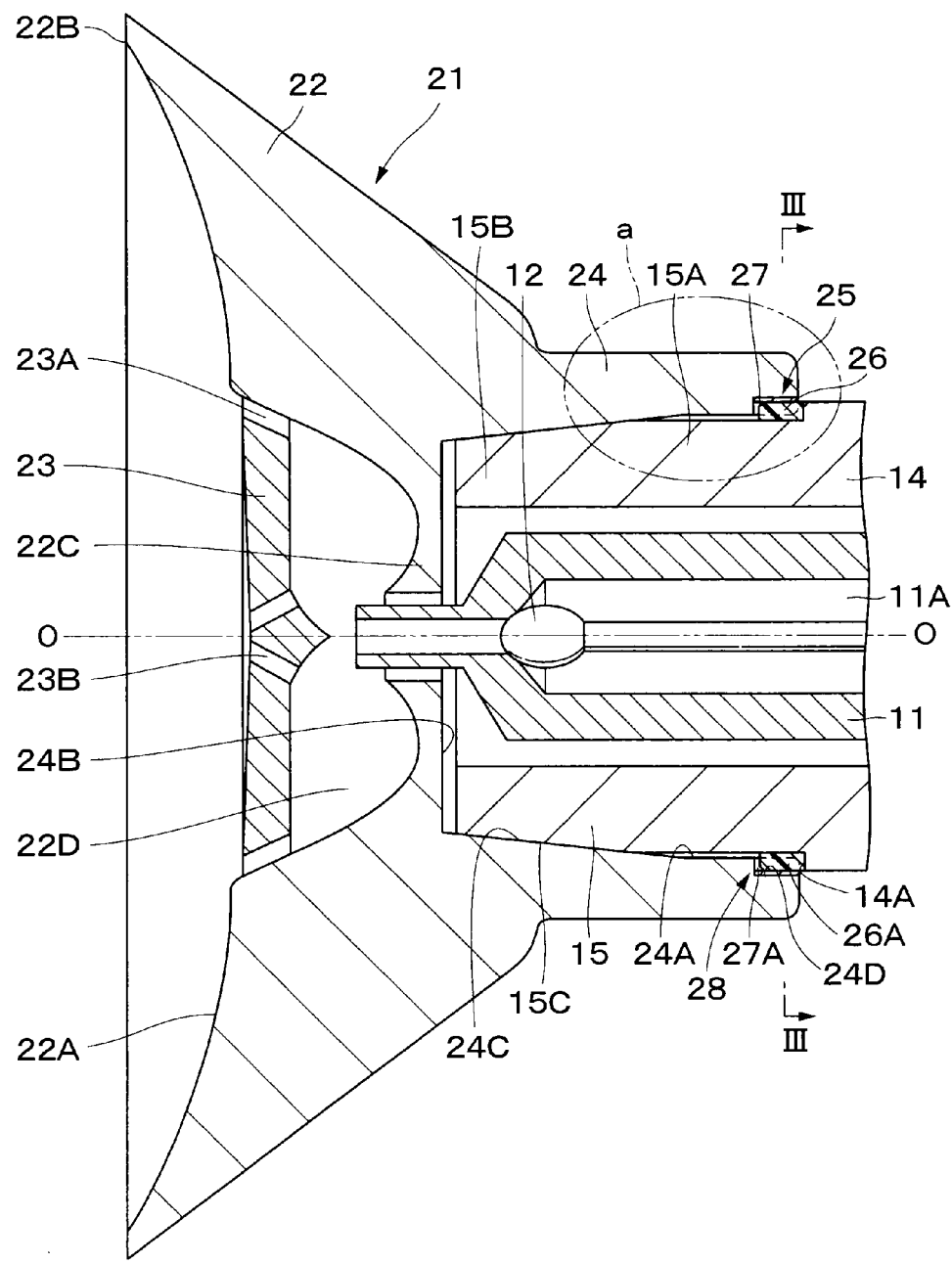
FIG. 2 is a longitudinal sectional view showing a rotational shaft and a rotary atomizing head in FIG. 1.

Indicated at 9 is a paint cartridge for supplying a paint to the rotary atomizing head 21. A variety of cartridges 9 storing separately the paints of color a, color b and up to color n are provided and are replaceably attached on the cartridge mounting portion 4 of the housing 2. Each cartridge 9 is largely constituted by a tank 10 which is formed as a cylindrical body (cylinder) and extended in forward and rearward directions along a longitudinal axis O-O, a feed tube 11 which is extended coaxially with the tank 10, namely with the longitudinal axis O-O, to serve as a paint nozzle, a paint valve 12 which is adapted to open and close a paint passage 11A in the feed tube 11 (only a distal end of a valve body is shown in FIG. 2), and a piston which divides the inside of the tank 10 into a paint chamber and an extruding thinner chamber (none are shown in the drawings).

Further, a male coupling portion 10A is projected on the front surface side of the tank 10 for engagement with the female coupling portion 4B of the cartridge mounting portion 4 provided on the housing 2. Further, an extruding thinner passage of the cartridge side (not shown) extending from the male coupling portion 10A toward the extruding thinner chamber is provided in the tank 10 to communicate with the extruding thinner passage 8 of the housing side.

On the other hand, a paint passage 11A is provided internally of the feed tube 11 in communication with a paint chamber in the tank 10. The feed tube 11 spouts paint in the paint chamber toward the rotary atomizing head 21 in a state of being placed in the feed tube passage hole 5 of the housing 2. In this instance, by extruding thinner which is fed to the extruding thinner chamber of the tank 10, the piston is pushed to permit paint in the paint chamber to flow out into the paint passage 11A of the feed tube 11.

Indicated at 13 is an air motor (a motor) which is accommodated in the motor mounting portion 3 of the housing 2. This air motor 13 is largely constituted by a motor casing 13A formed in a tubular shape, an air turbine 13B which is accommodated in the motor casing 13A, and a static air bearing 13C in the role of rotatably supporting a rotational shaft 14, which will be described hereinafter. By supply of compressed air to the air turbine 13B of the air motor 13, the rotational shaft 14 is rotationally driven in high speed (e.g., 3,000 to 150,000 rpm). Further, a high voltage generator (not shown) is connected to the air motor 13 to apply thereto a high voltage of from −60 kV to −150 kV for directly charging paint with a high voltage through the rotary atomizing head 21, which will be described later on.

Indicated at 14 is a rotational shaft which is rotatably supported by the static air bearing 13C of the air motor 13. The rotational shaft 14 is in the form of a hollow tubular shaft having a longitudinal axis O-O and extending in forward and rearward directions. Base end of the rotational shaft 14 is coupled with the air turbine 13B of the air motor 13, while its fore distal end is projected on the front side of the air motor 13 to support thereon a rotary atomizing head 21, which will be described in greater detail hereinafter.

Denoted at 15 is a mounting shaft section which is provided on a fore distal end of the rotational shaft 14, forward of a stepped portion 14A of the latter. The mounting shaft section 15 is composed of a tubular portion 15A which is formed in a tubular shape with a smaller diameter as compared with the rotational shaft 14 and extended in the axial direction, and a tapered portion 15B which is located at the fore distal end of the tubular portion 15A and gradually tapered off toward the fore distal end of the rotational shaft 14.

In this instance, the mounting shaft section 15 is provided at the fore distal end of the rotational shaft 14, forward of the above-mentioned radial stepped portion 14A. A male spline member 26 which will be described later is provided on the outer periphery of the tubular portion 15A at the position of the stepped portion 14A. Inclined outer peripheral surface 15C of the tapered portion 15B is formed by being inclined relative to the longitudinal axis O-O at the rotational center of the rotational shaft 14. A rotary atomizing head 21 which will be described hereinafter is mounted on this mounting shaft section 15.

Indicated at 21 is a rotary atomizing head which is mounted on the fore distal end of the rotational shaft 14. The rotary atomizing head 21 is composed of a main atomizing body 22 and a hub member 23 which will be described hereinafter.

Indicated at 22 is a main atomizing body which defines outer configuration of the rotary atomizing head 21. The main atomizing body 22 is formed of, for example, a conducting metallic material or a conducting synthetic resin material including iron, stainless steel, and aluminum alloy, in a bell- or cup-like shape flaring from the rear portion toward the front portion around its rotational center on the longitudinal axis O-O. In this instance, the main atomizing body 22 is arranged to provide a paint spreading surface 22A spreading in the shape of a saucer in a front portion of its inner peripheral surface. On the other hand, at the front end (outer peripheral end), the main atomizing body 22 is provided with releasing edges 22B contiguously from the paint spreading surface 22A.

Further, as shown in FIG. 2, on the rear portion, the main atomizing body 22 is provided with a mounting tube section 24 in the tubular shape which will be described later. In this instance, the main atomizing body 22 is provided with an annular partition wall 22C which is projected radially inward in such a way as to block up the deepest portion of the mounting tube section 24. The inner peripheral side of the annular partition wall 22C is so shaped as to fit therein a fore distal end of the feed tube 11.

Further, the main atomizing body 22 is provided with a paint reservoir 22D which is defined between the annular partition wall 22C and paint spreading surface 22A by a hub member 23, which will be described hereinafter. This paint reservoir 22D serves to temporarily hold paint which is spurted out from the feed tube 11.

When the rotary atomizing head 21 is put in high speed rotation, paint which is received in the paint reservoir 22D is supplied to the paint spreading surface 22A through a paint outlet passage 23A, which will be described hereinafter, and a thin film of paint from the paint spreading surface 22A is sprayed forward from the releasing edges 22B in the form of finely divided particles.

Indicated at 23 is a hub member in the shape of a round plate which is located between the paint spreading surface 22A and paint reservoir 22D of the main atomizing body 22. This hub member 23 is provided with a large number of paint outlet passages 23A around its outer peripheral surface thereby to guide paint or a solvent toward the paint spreading surface 22A of the main atomizing body 22, along with a plural number of solvent outlet passages 23B in a center portion to supply a solvent to the front surface of the hub member 23.

Designated at 24 is a mounting tube section which is provided at the rear portion of the main atomizing body 22. Provided on the inner peripheral surface of the mounting tube section 24 is a bottomed fitting hole 24A. On the other hand, a circular bottom surface 24B is formed at the deepest portion of the fitting hole 24A by the annular partition wall 22C.

Further, the fitting hole 24A is provided with an inclined inner peripheral surface 24C which is gradually extended in diameter from the bottom surface 24B toward its opening side (rear portion). The inclined inner peripheral surface 24C is inclined relative to the longitudinal axis O-O at the rotational center of the main atomizing body 22, and formed in a complementary fashion relative to an inclined outer peripheral surface 15C of the mounting shaft section 15. The mounting tube section 24 is mounted on the outer peripheral surface of the mounting shaft section 15 in such a way as to accommodate the tapered portion 15B in the fitting hole 24A.

Further, a female spline fitting portion 24D in the form of an annular groove of a larger diameter is formed at the position of the opening side in the fitting hole 24A of the mounting tube section 24. In association with this female spline fitting portion 24D, a female spline member 27 is provided in the manner as described in greater detail hereinafter.

Now, described below are rotation restricting mechanism 25 and axial displacement restricting mechanism 28, which feature the first embodiment.

Figure 3:
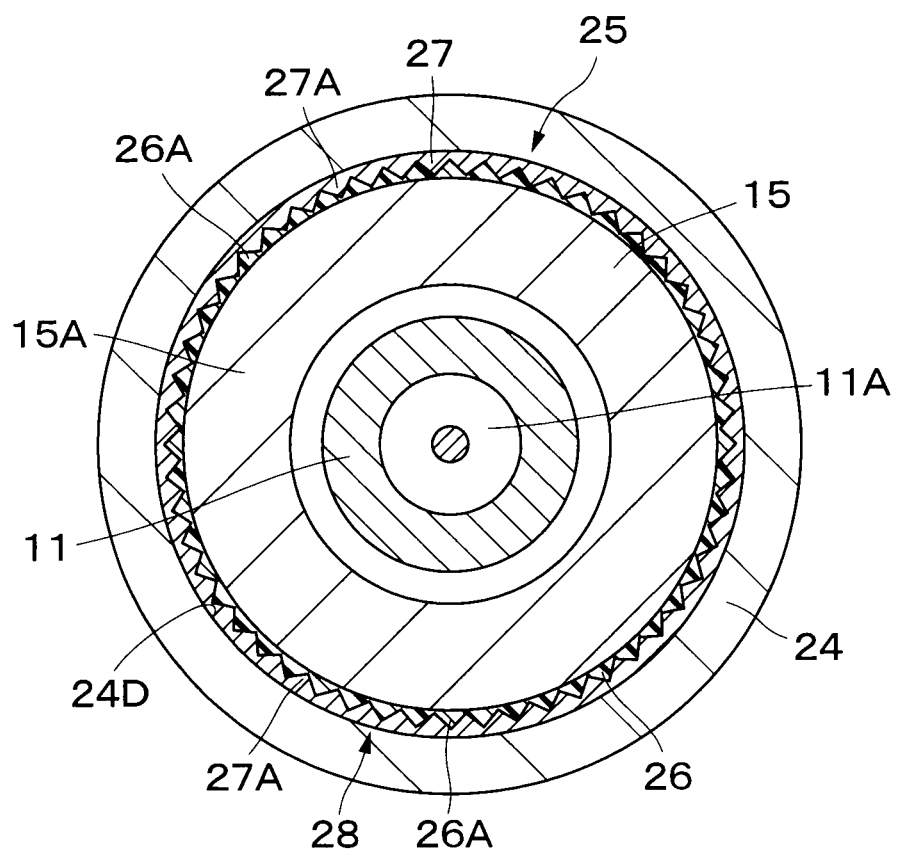
FIG. 3 is a cross-sectional view of a rotation restricting mechanism taken from the direction of arrows III-III in FIG. 2.
Figure 4:
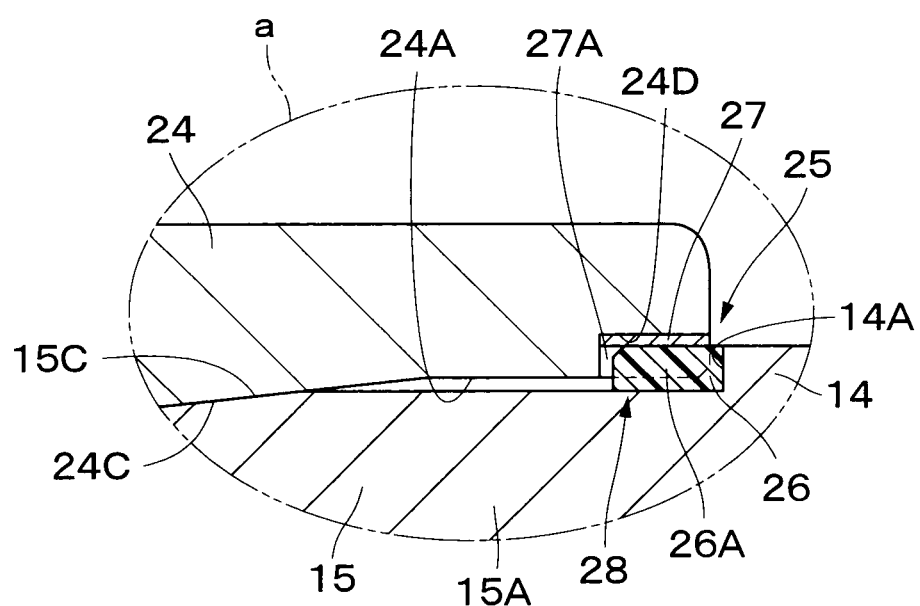
FIG. 4 is an enlarged sectional view of the rotation restricting mechanism in a demarcated area a in FIG. 2.

More particularly, indicated at 25 is a rotation restricting mechanism which is provided between the mounting shaft section 15 of the rotational shaft 14 and the mounting tube section 24 of the rotary atomizing head 21. This rotation restricting mechanism 25 functions to restrict rotational movements of the rotary atomizing head 21 relative to the rotational shaft 14 in the circumferential or rotational direction. As shown in FIGS. 3 and 4, the rotation restricting mechanism 25 is composed of male and female spline members 26 and 27, which will be described below.

Denoted at 26 is a male spline member which is provided on the tubular portion 15A of the mounting shaft section 15 adjacently to the radial stepped portion 14A of the rotational shaft 14. This male spline member 26 is formed in the shape of a gear in cross section and projected radially outward from an outer peripheral surface of the tubular portion 15A.

Further, the male spline member 26 is composed of a plural number of spline teeth 26A, for example, of a triangular shape in cross section, provided around the outer peripheral surface of the mounting shaft section 15. In this instance, the respective spline teeth 26A are extended in the axial direction in parallel relation with the longitudinal axis O-O and locate at uniform intervals in the circumferential or rotational direction entirely around the rotational shaft 14. Therefore, the male spline member 26 is arranged to entirely cover the outer peripheral surface of a base end portion of the mounting shaft section 15.

In this instance, at least one of the male spline member 26 and female spline member 27, which will be described later on, is formed of a resiliently deformable synthetic resin material or rubber material in the shape of an annular ring, for example, like the male spline member 26 of the present embodiment. Namely, the male spline member 26 is in the form of an annular ring having spline teeth 26A all around its outer peripheral side. More particularly, the male spline member 26 is fitted on the tubular portion 15A of the mounting shaft section 15 on the front side of the stepped portion 14A of the rotational shaft 14, and fixed in position, for example, by the use of an adhesive agent.

Indicated at 27 is a female spline member which is provided in the female spline fitting portion 24D of the mounting tube section 24 of the rotary atomizing head 21. This female spline member 27 is in the shape of a gear in cross section and projected radially inward from the inner peripheral surface of the mounting tube section 24.

More specifically, the female spline member 27 is composed of a plural number of spline teeth 27A, for example, of a triangular shape in cross section, provided around the inner peripheral surface of the mounting tube section 24. In this instance, the respective spline teeth 27A are extended in the axial direction in parallel relation with the longitudinal axis O-O and located at uniform intervals in the circumferential direction entirely around the fitting hole 24A correspondingly to the respective spline teeth 26A of the male spline member 26. Thus, the female spline member 27 is arranged to entirely cover the inner peripheral surface of the opening side of the fitting hole 24A of the mounting tube section 24.

In this regard, in the case of the present embodiment, the female spline member 27 is formed, for example, in the shape of a ring by the use of metallic material such as iron or stainless steel or by the use of hard synthetic resin material, separately from the rotary atomizing head 21. Namely, the female spline member 27 is in the form of an annular ring having spline teeth 27A all around its inner peripheral side. Further, this female spline member 27 is fixed in the female spline fitting portion 24D of the mounting tube section 24, for example, by press fit or by the use of an adhesive agent. If desired, the female spline member 27 may be formed integrally on the mounting tube section 24 by the use of the same material as the mounting tube section 24 of the rotary atomizing head 21.

At the time of mounting the rotary atomizing head 21 on the rotational shaft 14, the spline teeth 27A of the female spline member 27 are brought into engagement with grooves between spline teeth 26A of the male spline member 26 in such a way as to mesh a plural number of spline teeth 27A with a plural number of spline teeth 26A. Thus, the male and female spline members 26 and 27 are engaged with each other in the rotational direction to restrict the relative displacement of the rotary atomizing head 21 relative to the rotational shaft 14.

Further, indicated at 28 is an axial displacement restricting mechanism which is provided in association with the rotation restricting mechanism 25. Namely, the male spline member 26 is, for example, formed of a resiliently deformable synthetic resin material while the female spline member 27 is formed of a metallic material. Therefore, as the spline teeth 26A are engaged with grooves between the spline teeth 27A, an axial frictional resistance occurs between the spline teeth 26A of the male spline member 26 and the spline teeth 27A of the female spline member 27. As a consequence, in addition to the rotation restricting mechanism 25, the male and female spline members 26 and 27 can be utilized to make up the axial displacement restricting mechanism 28 which restricts the axial displacement of the rotary atomizing head 21 relative to the rotational shaft 14.

Accordingly, in the case of the first embodiment, the male and female spline members 26 and 27 have dual functions to serve as the rotation restricting mechanism 25 and as the axial displacement restricting mechanism 28.

The coating device 1 in accordance with the first embodiment has the above-described arrangements, and a description will be given on its operation.

Firstly, at the time of painting a work piece like a vehicle body, the air motor 13 is rotationally driven to put the rotary atomizing head 21 in high speed rotation along with the rotational shaft 14. While keeping the rotary atomizing head 21 in rotation together with the rotational shaft 14, a high voltage is applied to the rotary atomizing head 21 concurrently with supply of paint to the paint reservoir 22D of the rotary atomizing head 21 through the feed tube 11. The paint, supplied in the paint reservoir 22D, is urged to flow out onto the paint spreading surface 22A of the main atomizing body 22 through the paint outlet passages 23A of the hub member 23 under the influence of centrifugal force. The paint flowing out of the paint outlet passages 23A is spread into the shape of a thin film on the paint spreading surface 22A and sprayed forward in the form of finely divided particles from the releasing edges 22B for deposition on a work piece.

On the other hand, at the time of changing the paint color, similarly in a state of rotationally driving the rotary atomizing head 21, a solvent such as thinner is supplied instead of paint to the paint reservoir 22D of the rotary atomizing head 21. The paint reservoir 22D is washed with the solvent, and then paint residues on the paint spreading surface 22A and releasing edges 22B of the main atomizing body 22 are washed away by a solvent flowing out of the paint outlet passages 23A of the hub member 23. Concurrently, the front surface of the hub member 23 is washed clean by a solvent which flows out through the solvent outlet passages 23B.

In this instance, it may become necessary to dismantle the rotary atomizing head 21 for the purpose of washing more elaborately the rotary atomizing head 21 and a fore distal end portion of the feed tube 11. Besides, depending upon the shape and size of a work piece, it may become necessary to replace the rotary atomizing head 21. Next, a description will be given on a case where the rotary atomizing head 21 is dismantled from and mounted on the rotational shaft 14.

In the first place, at the time of dismantling the rotary atomizing head 21 from the rotational shaft 14, the rotary atomizing head 21 is pulled axially toward a front portion side against a frictional force occurring between the male and female spline members 26 and 27. By so doing, the mounting tube section 24 of the main atomizing body 22 can be detached from the mounting shaft section 15 of the rotational shaft 14.

On the other hand, at the time of mounting a rotary atomizing head 21 on the rotational shaft 14, after placing the tapered portion 15B of the mounting shaft section 15 in the fitting hole 24A of the mounting tube section 24, the main atomizing body 22 is pushed onto the rotational shaft 14. At this time, the rear end of the female spline member 27 is brought into abutting engagement with the fore distal end of the male spline member 26. Then, the rotary atomizing head 21 is rotated in the rotational direction to find the position in which the spline teeth 26A of the male spline member 26 can get into V-grooves between the spline teeth 27A of the female spline member 27. Then, the rotary atomizing head 21 is pushed onto the rotational shaft 14, sliding the spline teeth 26A into the grooves between the spline teeth 27A against the frictional force which occurs between the respective spline teeth 26A and 27A. As a result, by the frictional force which occurs between the male and female spline members 26 and 27, the rotary atomizing head 21 can be mounted on the rotational shaft 14 in a retained state.

As the rotary atomizing head 21 is pushed against the rotational shaft 14, the inclined inner peripheral surface 24C of the mounting tube section 24 is abutted against the inclined outer peripheral surface 15C of the mounting shaft section 15. At this time, under the guidance of the inclined outer peripheral surface 15C of the tapered portion 15B, the rotary atomizing head 21 is set in a coaxially aligned position relative to the rotational center of the rotational shaft 14. Therefore, the rotary atomizing head 21 is automatically alignment with the center of the rotational shaft 14, and the center axis of the rotary atomizing head 21 is aligned with that of the rotational shaft 14 (the longitudinal axis O-O).

In addition, by the meshing engagement of the spline teeth 26A and 27A, the relative displacement of the rotary atomizing head 21 in the rotational direction relative to the rotational shaft 14 is restricted. Therefore, even in the event of an abrupt increase or decrease in rotational speed of the air motor 13, the rotary atomizing head 21 can be kept in rotation integrally with the rotational shaft 14. That is to say, on such an occasion, there is no possibility of a gap space or loosening phenomena occurring between the mounting tube section 24 of the rotary atomizing head 21 and the mounting shaft section 15 of the rotational shaft 14. Therefore, the inclined inner peripheral surface 24C is continually kept in intimate contact with the inclined outer peripheral surface 15C. Thus, a center axis of the rotary atomizing head 21 can be constantly kept in alignment with a center axis (the longitudinal axis O-O) of the rotational shaft 14 to keep the rotational balance of the rotary atomizing head 21 in a good state.

As described above, in the first embodiment of the invention, the rotation restricting mechanism 25 is provided between the mounting shaft section 15 of the rotational shaft 14 and the mounting tube section 24 of the rotary atomizing head 21. Thus, by the rotation restricting mechanism 25, the rotational displacement of the rotary atomizing head 21 in the rotational direction relative to the rotational shaft 14 is restricted.

As a consequence, despite an increase or a drop in rotational speed, the rotary atomizing head 21 can be stably retained in a fixed state relative to the rotational shaft 14 to prevent rotational deviations of the rotary atomizing head 21 from the rotational shaft 14. That is to say, the center axis of the rotary atomizing head 21 can be constantly kept in alignment with that of the rotational shaft 14, thereby preventing the rotational shaft 14 from contacting the static air bearing 13C to guarantee high reliability and durability of the machine.

Further, even in the event of an increase or a drop in rotational speed, the rotary atomizing head 21 is kept in rotation integrally with the rotational shaft 14, without follow-up delay between the rotational shaft 14 and the rotary atomizing head 21. Therefore, even in a paint coating operation involving variations in rpm of the rotational shaft 14, for example, paint can be quickly atomized into a particle size corresponding to a rotational speed to ensure higher quality of coating.

Further, the rotation restricting mechanism 25 is composed of the male spline member 26 which is provided on the outer peripheral side of the mounting shaft section 15 of the rotational shaft 14, and the female spline member 27 which is provided on the inner peripheral side of the mounting tube section 24 of the rotary atomizing head 21. Therefore, the rotary atomizing head 21 can be readily mounted on the rotational shaft 14 simply by coupling the male and female spline members 26 and 27 with each other. Thus, the rotary atomizing head 21 can be mounted on the rotational shaft 14 without using screw threads. That is to say, in the event of an abrupt drop in rotational speed of the air motor 13, the rotary atomizing head 21 does not get dislodged from the rotational shaft 14, thereby enhancing the stability of the rotary atomizing head 21 relative to the rotational shaft 14.

Besides, the axial displacement restricting mechanism 28 is provided between the mounting shaft section 15 of the rotational shaft 14 and the mounting tube section 24 of the rotary atomizing head 21 to restrict an axial displacement of the rotary atomizing head 21 relative to the rotational shaft 14 by means of the axial displacement restricting mechanism 28, thereby making it possible to reliably prevent dislodgement of the rotary atomizing head 21.

Especially in the case of the first embodiment, the axial displacement restricting mechanism 28 is arranged to utilize the axial frictional resistance which occurs between the respective spline teeth 26A and 27A of the male and female spline members 26 and 27. That is to say, the male and female spline members 26 and 27 have dual functions to serve as the rotation restricting mechanism 25 and as the axial displacement restricting mechanism 28. Accordingly, the mounting shaft section 15 of the rotational shaft 14 as well as the mounting tube section 24 of the rotary atomizing head 21 can be downsized into a compact form as compared with a case where the rotation restricting mechanism 25 is provided separately from an axial displacement restricting mechanism 28.

Further, in a case of effecting a retaining by providing a resilient ring between amounting shaft section 15 and amounting tube section 24 as in Patent Literature 5, the resilient ring is twisted and abraded by sliding contact with the other mounting component part at the time of mounting and dismantling the rotary atomizing head 21, to invite degradations in durability and reliability of the machine. In contrast, in the case of the above-described first embodiment, for enhancing durability as well as reliability, axial frictional resistances between the male and female spline members 26 and 27 are utilized, without occurrence of twists in a resilient ring.

Figure 5:
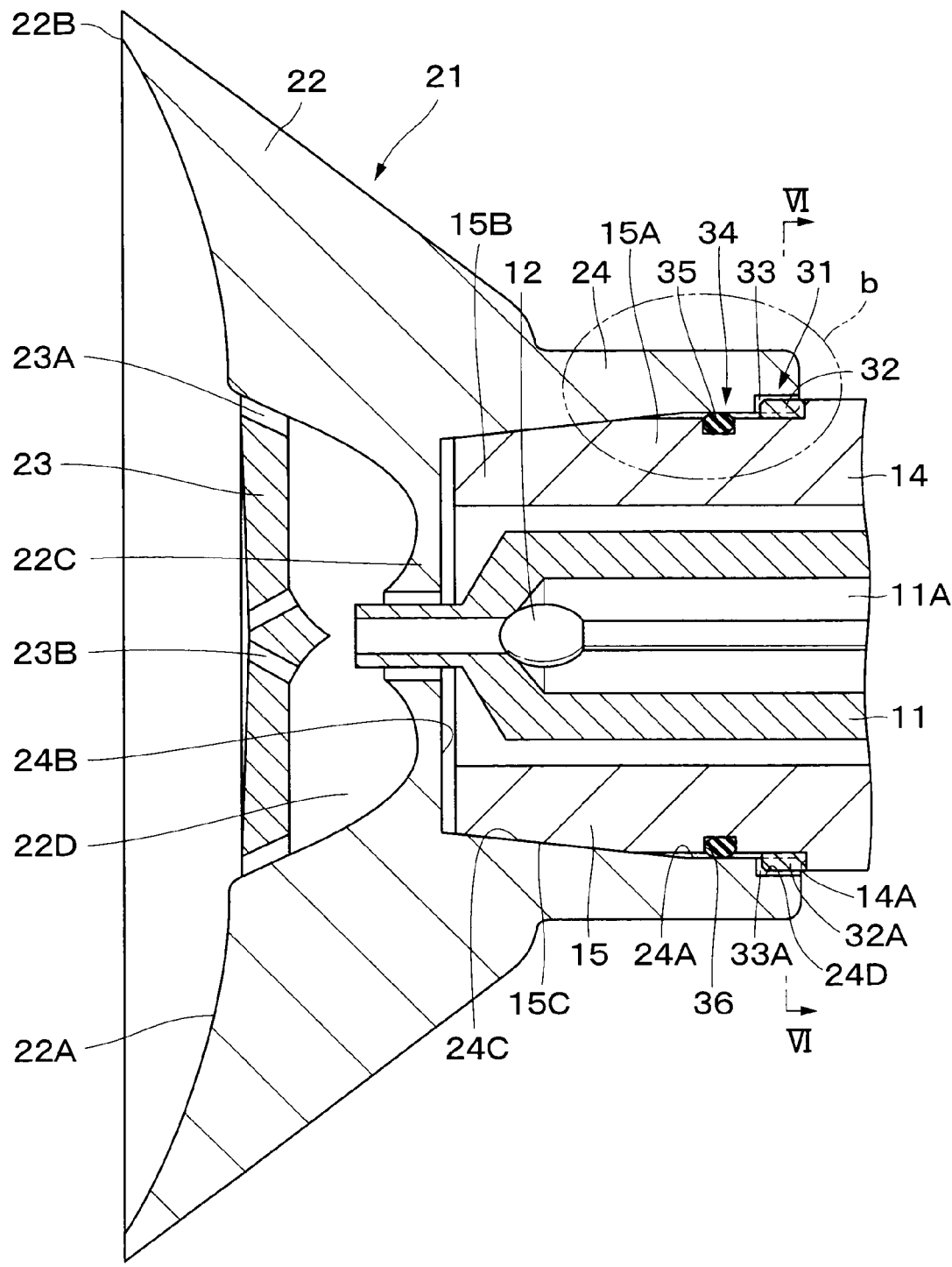
FIG. 5 is a longitudinal sectional view showing a rotational shaft and a rotary atomizing head according to a second embodiment of the invention.
Figure 6:
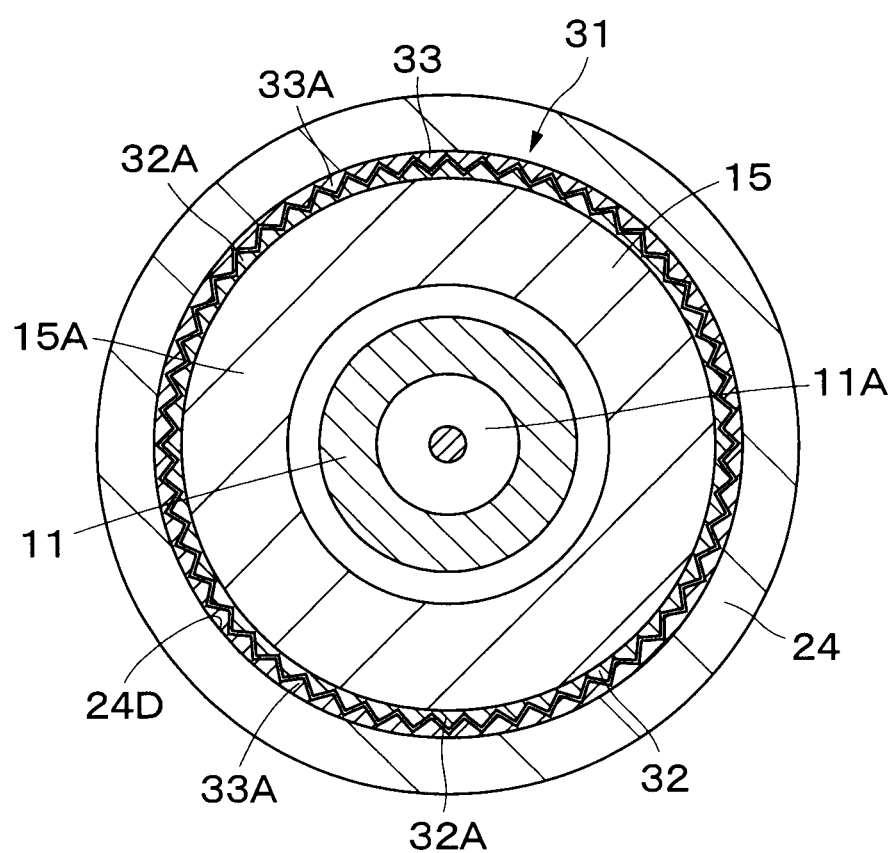
FIG. 6 is a cross-sectional view of a rotation restricting mechanism taken from the direction of arrows VI-VI in FIG. 5.
Figure 7:
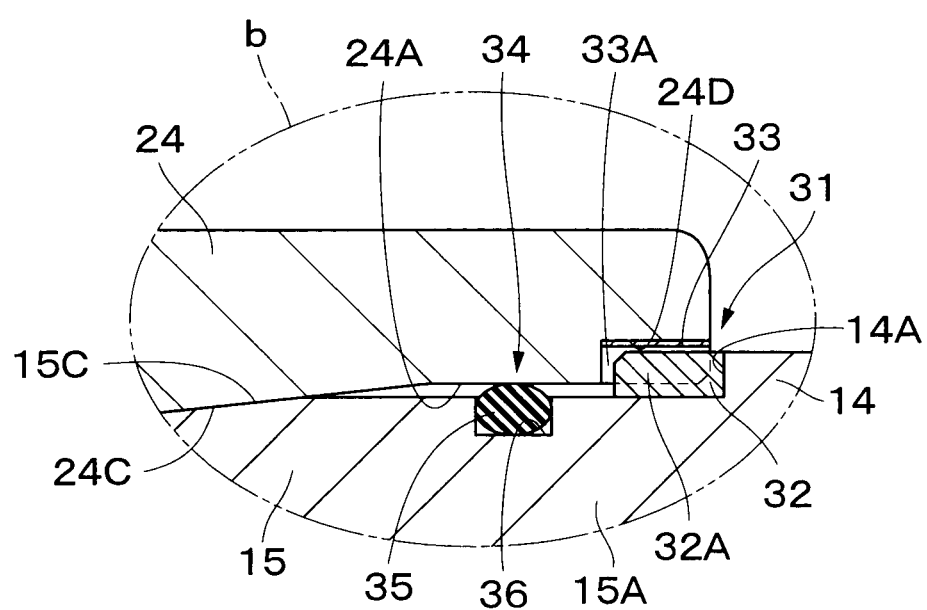
FIG. 7 is an enlarged sectional view of the rotation restricting mechanism in a demarcated area b in FIG. 5.

Now, turning to FIGS. 5 to 7, there is shown a second embodiment of the present invention. This second embodiment has a feature in that an axial displacement restricting mechanism is constituted by a resilient ring which is provided on a mounting shaft section of a rotational shaft and adapted to resiliently contact a mounting tube section of a rotary atomizing head. In the following description of the second embodiment, those component parts which are identical with counterparts in the foregoing first embodiment are simply designated by the same reference numerals to avoid repetitions of similar explanations.

Indicated at 31 is a rotation restricting mechanism adopted in the second embodiment. Substantially in the same way as the rotation restricting mechanism 25 in the first embodiment, this rotation restricting mechanism 31 is constituted by a male spline member 32 which is provided on the outer peripheral side of a mounting shaft section 15 of a rotational shaft 14 and a female spline member 33 which is provided on the inner peripheral side of a mounting tube section 24 of a rotary atomizing head 21.

In the second embodiment, both of male and female spline members 32 and 33 are formed of a conducting metallic material such as iron, stainless steel or aluminum alloy or a conducting synthetic resin material.

In this instance, the male spline member 32 is formed in an annular ring shape having spline teeth 32A all around its outer peripheral side. This male spline member 32 is fitted on a tubular portion 15A of a mounting shaft section 15 and a stepped portion 14A of the rotational shaft 14, and fixed in position. On the other hand, the female spline member 33 is formed in an annular ring shape having spline teeth 33A all around its inner peripheral side. The female spline member 33 is fixed in a female spline fitting portion 24D of the mounting tube section 24.

However, the male and female spline members 32 and 33 of the rotation restricting mechanism 31 are different from the male and female spline members 26 and 27 in the foregoing first embodiment in that they do not need to function as an axial displacement restricting mechanism. Therefore, in this case, a small gap is provided between the male and female spline members 32 and 33 to permit the spline teeth 32A to get into the grooves between the spline teeth 33A.

Denoted at 34 is an axial displacement restricting mechanism adopted in the second embodiment. This axial displacement restricting mechanism 34 differs from the axial displacement restricting mechanism 28 of the first embodiment in that it is provided separately from the rotation restricting mechanism 31. More particularly, the axial displacement restricting mechanism 34 is constituted by a resilient ring 35 like an O-ring, which is fitted on the outer peripheral side of the mounting shaft section 15 of the rotational shaft 14.

In this instance, a ring fitting groove 36 in which the resilient ring 35 is fitted is formed around a tubular portion 15A of the mounting shaft section 15. The ring fitting groove 36 is formed by an indented groove of a square shape in cross section, extended in the circumferential direction around the outer peripheral surface of the tubular portion 15A, and formed in an annular shape in such a way as to surround the tubular portion 15A.

Further, the resilient ring 35 is fitted in the ring fitting groove 36 and its outer peripheral side is projected from the ring fitting groove 36. The resilient ring 35 is arranged to resiliently contact inner peripheral side of the mounting tube section 24 of the rotary atomizing head 21 to restrict axial displacements of the latter.

Thus, the above-described second embodiment of the invention can obtain substantially the same operational effects as the foregoing first embodiment. Especially in the second embodiment, axial displacement restricting mechanism 34 is constituted by the resilient ring 35 which is provided on the mounting shaft section 15 of the rotational shaft 14. Therefore, axial displacements of the rotary atomizing head 21 relative to the rotational shaft 14 can be prevented by resiliently contacting the resilient ring 35 with the inner peripheral surface of the mounting tube section 24 of the rotary atomizing head 21.

In the case of the second embodiment adopting the axial displacement restricting mechanism 34 separately from the rotation restricting mechanism 31, it suffices for the axial displacement restricting mechanism 34 to have a function of restricting axial displacement of the rotary atomizing head 21 so that it has a broader freedom in design, particularly with regard to the material and shape of the resilient ring 35.

Further, in the second embodiment, the resilient ring 35 is provided on the outer peripheral side of the mounting shaft section 15 of the rotational shaft 14 and is arranged to resiliently contact the inner peripheral surface of the mounting tube section 24 of the rotary atomizing head 21. However, the present invention is not limited to this particular arrangement. For example, the resilient ring may be provided on the inner peripheral side of the mounting tube section 24 of the rotary atomizing head 21 and arranged to be resiliently contact the outer peripheral surface of the mounting shaft section 15 of the rotational shaft 14.

Figure 8:
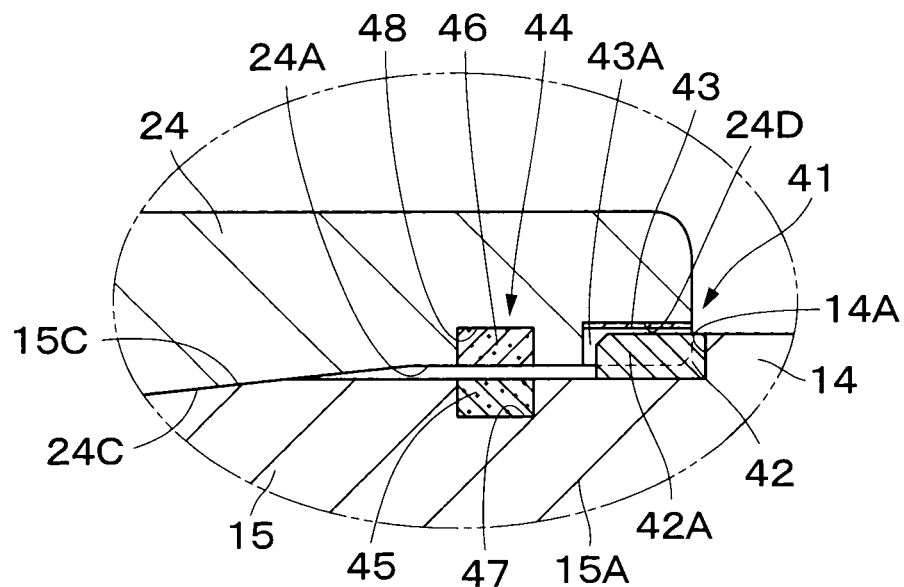
FIG. 8 is an enlarged sectional view showing a rotation restricting mechanism according to a third embodiment of the invention, taken in the same position as FIG. 4.

Now, turning to FIG. 8, there is shown a third embodiment of the invention. The third embodiment has a feature in that an axial displacement restricting mechanism is constituted by a first magnetic ring which is provided on a mounting shaft section of a rotational shaft and a second magnetic ring which is provided on a mounting tube section of a rotary atomizing head. In the following description of the third embodiment, those component parts which are identical with counterparts in the foregoing first embodiment are simply designated by the same reference numerals to avoid repetitions of similar explanations.

Indicated at 41 is a rotation restricting mechanism adopted in the third embodiment. Substantially in the same way as the rotation restricting mechanism 31 in the second embodiment, this rotation restricting mechanism 41 is constituted by a male spline member 42 which is composed of a plural number of spline teeth 42A provided around the outer peripheral side of the mounting shaft section 15 of the rotational shaft 14, and a female spline member 43 which is composed of a plural number of spline teeth 43A provided around the inner peripheral side of the mounting tube section 24 of the rotary atomizing head 21.

Denoted at 44 is an axial displacement restricting mechanism adopted in the third embodiment. This axial displacement restricting mechanism 44 differs from the axial displacement restricting mechanism 28 of the first embodiment in that it is provided separately from the rotation restricting mechanism 41. More particularly, the axial displacement restricting mechanism 44 is constituted by a first magnetic ring (a first magnetic member) 45 which is provided on the outer peripheral side of the mounting shaft section 15 of the rotational shaft 14, and a second magnetic ring (a second magnetic member) 46 which is provided on the inner peripheral side of the mounting tube section 24 of the rotary atomizing head 21.

In this instance, a first ring fitting groove 47 in which the first magnetic ring 45 is fitted is formed around the outer peripheral side of a tubular portion 15A of the mounting shaft section 15 at a position on the front side of the male spline member 42. For example, the ring fitting groove 47 is formed in an annular groove of a square shape in cross section and extended in the circumferential direction around the outer peripheral surface of the tubular portion 15A.

On the other hand, a second ring fitting groove 48 in which the second magnetic ring 46 is fitted is formed around the inner peripheral side of the mounting tube section 24 at a position on the front side of the female spline member 43. In this instance, the second ring fitting groove 48 is formed at a position which is confronted by the first ring fitting groove 47 when the rotary atomizing head 21 is mounted on the rotational shaft 14. For example, the ring fitting groove 48 is formed in an annular groove of a square shape in cross section and extended in the circumferential direction around the inner peripheral surface of the fitting hole 24A.

Further, for example, the first magnetic ring 45 is formed of a magnetic material with magnetic force like a permanent magnet and the like, in the shape of a ring which is square in cross section. The first magnetic ring 45 is placed in the first ring fitting groove 47 of the mounting shaft section 15. On the other hand, for example, the second magnetic ring 46 is formed of a magnetic material, in the shape of a ring which is square in cross section, and placed in the second ring fitting groove 48 of the mounting tube section 24.

Further, the second magnetic ring 46 is arranged to be attracted to the first magnetic ring 45 by the magnetic force of the latter. When the rotary atomizing head 21 is mounted on the rotational shaft 14, the first magnetic ring 45 is arranged to be confronted by the second magnetic ring 46 through a gap space.

Thus, the above-described third embodiment can obtain substantially the same operational effects as the foregoing first embodiment. Especially in the case of the third embodiment, the axial displacement restricting mechanism 44 is constituted by the first and second magnetic rings 45 and 46 which are provided on the mounting shaft section 15 of the rotational shaft 14 and the mounting tube section 24 of the rotary atomizing head 21, respectively. For this reason, attracting force takes place between the first and second magnetic rings 45 and 46 by the magnetic force, whereby axial displacements of the rotary atomizing head 21 relative to the rotational shaft 14 can be prevented by using the first and second magnetic rings 45 and 46.

Further, the second magnetic ring 46 of the axial displacement restricting mechanism 44 is provided in the fitting hole 24A of the mounting tube section 24 in such a way as to confront the first magnetic ring 45 across a small gap space. Thus, the first and second magnetic rings 45 and 46 are kept out of direct contact with each other, thereby to ensure higher durability, precluding abrasive wear which might occur to the first and second magnetic rings 45 and 46 as compared with the case of using the resilient rings in the foregoing second embodiment.

Besides, in the third embodiment, the axial displacement restricting mechanism 44 is arranged to be constituted by the first and second magnetic rings 45 and 46 which are formed in the shape of a ring so as to surround the rotational shaft 14. However, the present invention is not limited to the particular example shown. For example, arrangements maybe adopted such that a plural number of first magnetic members are located at intervals in the circumferential direction around the mounting shaft section 15 of the rotational shaft 14, and a plural number of second magnetic members are located at intervals in the circumferential direction around the mounting tube section 24 of the rotary atomizing head 21.

Figure 9:
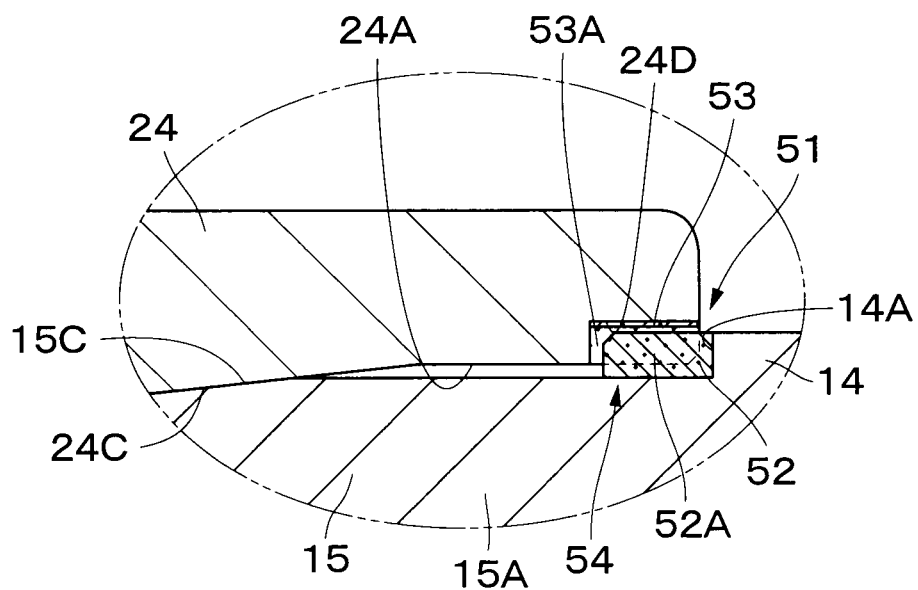
FIG. 9 is an enlarged sectional view showing a rotation restricting mechanism according to a fourth embodiment of the invention, taken in the same position as FIG. 4.
Figure 10:
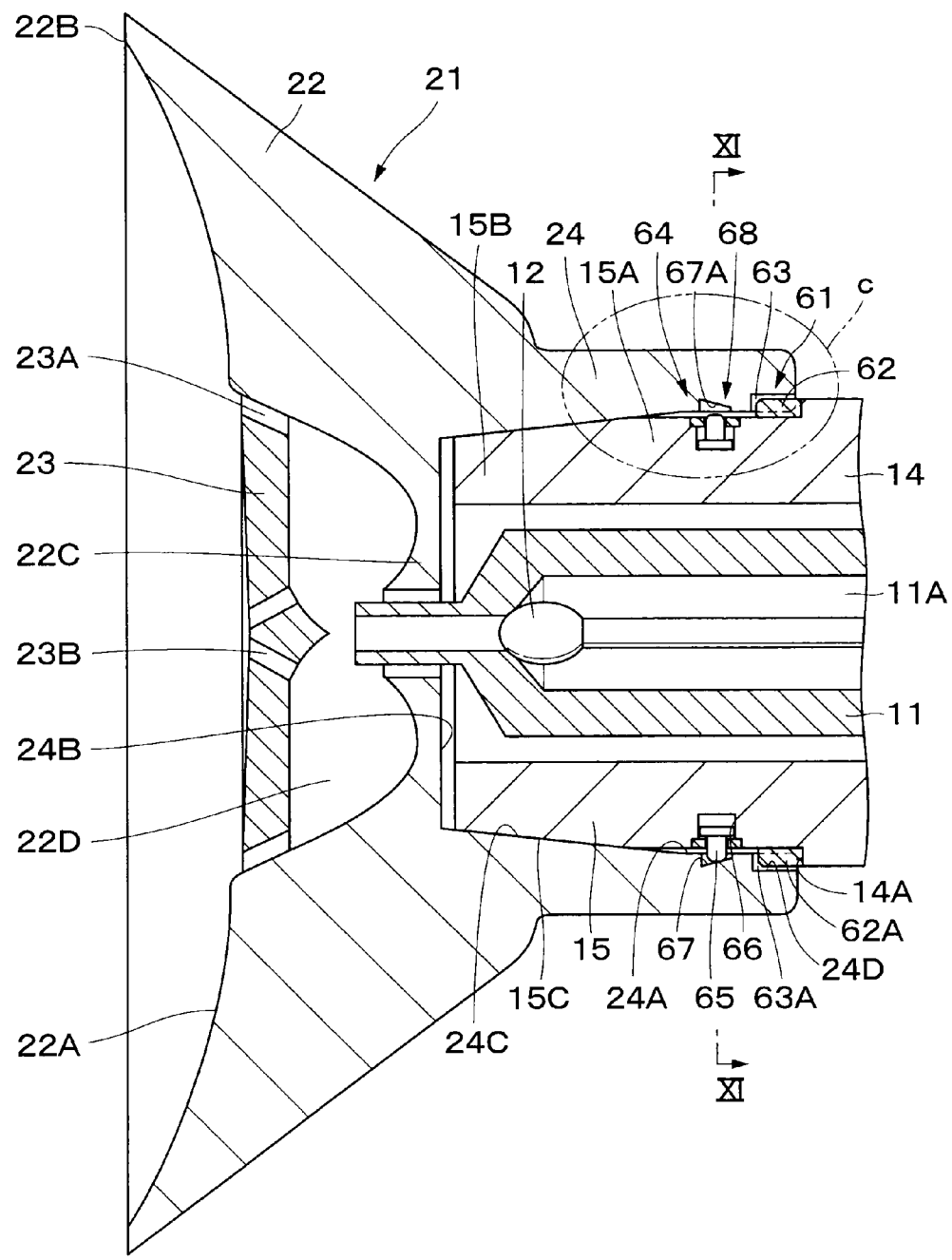
FIG. 10 is a longitudinal sectional view showing a rotational shaft and a rotary atomizing head according to a fifth embodiment of the invention.
Figure 11:
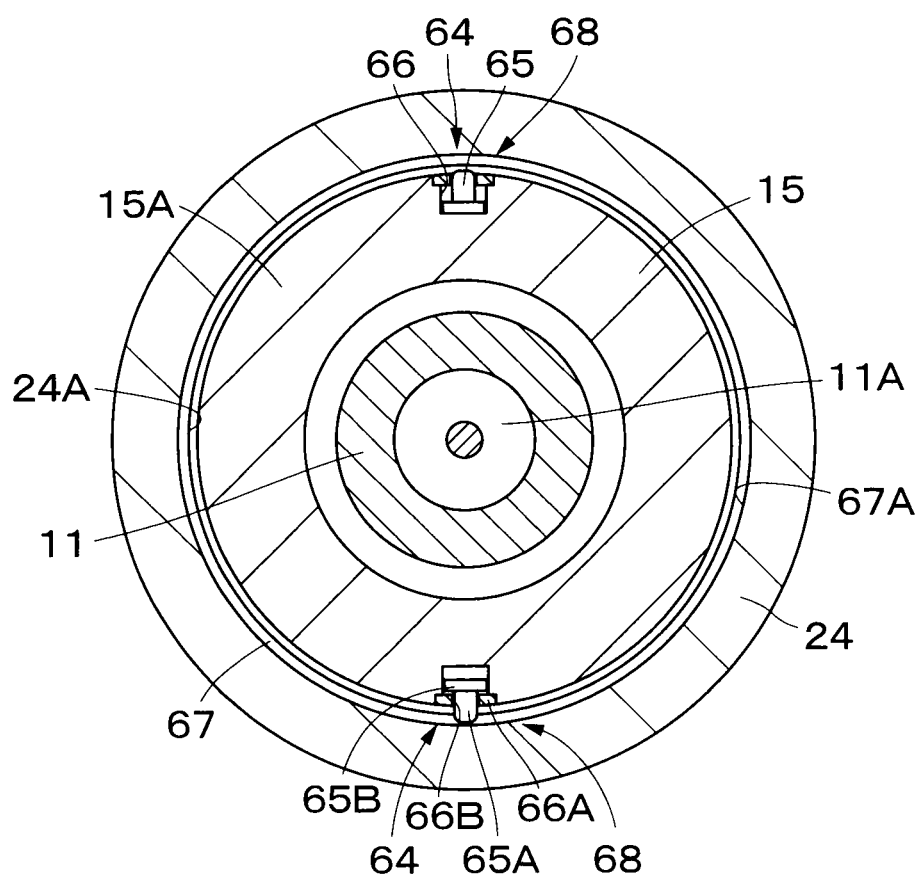
FIG. 11 is a cross-sectional view of a rotation restricting mechanism taken from the direction of arrows XI-XI in FIG. 10.
Figure 12:
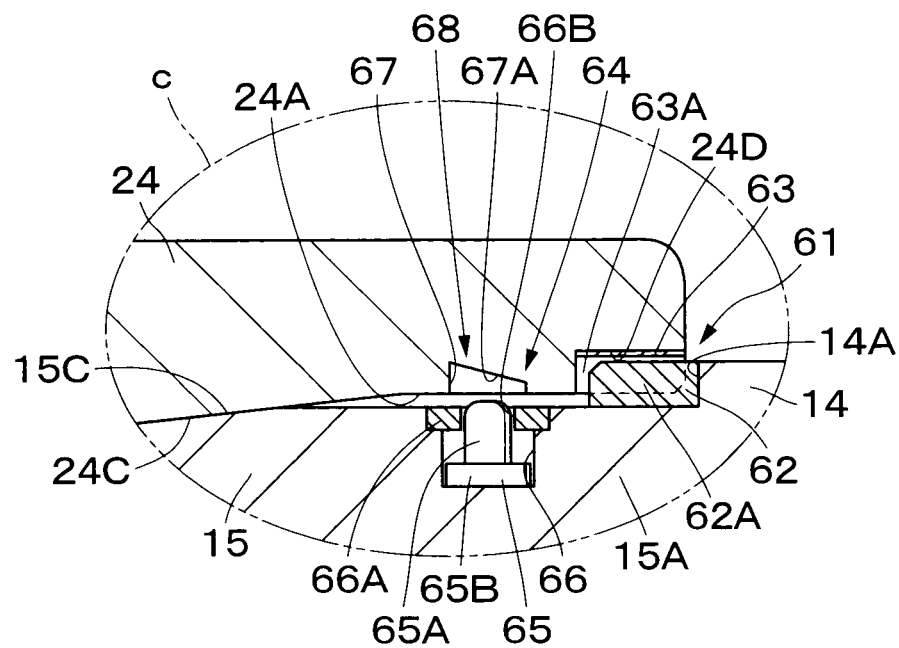
FIG. 12 is an enlarged sectional view of the rotation restricting mechanism in a demarcated area c in FIG. 10.

Now, turning to FIG. 9, there is shown a fourth embodiment of the present invention. This fourth embodiment has a feature in that an axial displacement restricting mechanism is constituted by male and female spline members which are attracted toward each other by magnetic force. In the following description of the fourth embodiment, those component parts which are identical with counterparts in the foregoing first embodiment are simply designated by same reference numerals to avoid repetitions of similar explanations.

Indicated at 51 is a rotation restricting mechanism adopted in the fourth embodiment. Substantially in the same way as the rotation restricting mechanism 25 in the first embodiment, this rotation restricting mechanism 51 is constituted by a male spline member 52 which is provided on the outer peripheral side of a mounting shaft section 15 of a rotational shaft 14, and a female spline member 53 which is provided on the inner peripheral side of a mounting tube section 24 of a rotary atomizing head 21.

In this instance, the male spline member 52 is formed in an annular ring shape having spline teeth 52A all around its outer peripheral side. This male spline member 52 is fitted on a tubular portion 15A of the mounting shaft section 15 and a stepped portion 14A of the rotational shaft 14, and fixed in position. The female spline member 53 is formed in an annular ring shape having spline teeth 53A all around its inner peripheral side. This female spline member 53 is fixed in a female spline fitting portion 24D of a mounting tube section 24.

In the fourth embodiment, the male spline member 52 is formed of a magnetic material with magnetic force like a permanent magnet. On the other hand, the female spline member 53 is formed of a magnetic material, for example, a ferrous magnetic material. For this reason, the male and female spline members 52 and 53 are magnetically attracted toward each other by the magnetical attracting force taking place therebetween. Thus, in this case, the male and female spline members 52 and 53 constitute a rotation restricting mechanism 51 and an axial displacement restricting mechanism 54 for restricting the axial displacement of the rotary atomizing head 21 relative to the rotational shaft 14.

A small gap space is formed between the male and female spline members 52 and 53 to permit spline teeth 52A to intrude easily into the grooves between spline teeth 53A.

Thus, the fourth embodiment can obtain substantially the same operational effects as the foregoing first and third embodiments.

Now, turning to FIGS. 10 to 13, there is shown a fifth embodiment of the invention. The fifth embodiment has features in that an axial displacement restricting mechanism is constituted by coupling projections which are radially displaceable and provided on a mounting shaft section of a rotational shaft, and a fitting groove which is provided on a mounting tube section of a rotary atomizing head, while an axial aligning mechanism is constituted by an inclined bottom surface which is provided at the bottom portion of the fitting groove. In the following description of the fifth embodiment, those component parts which are identical with counterparts in the foregoing first embodiment are simply designated by the same reference numerals to avoid repetitions of similar explanations.

Indicated at 61 is a rotation restricting mechanism adopted in the fifth embodiment. Substantially in the same way as the rotation restricting mechanism 31 in the second embodiment, this rotation restricting mechanism 61 is constituted by a male spline member 62 which is composed of a plural number of spline teeth 62A provided around the outer peripheral side of a mounting shaft section 15 of a rotational shaft 14, and a female spline member 63 which is composed of a plural number of spline teeth 63A provided around the inner peripheral side of a mounting tube section 24 of a rotary atomizing head 21.

Denoted at 64 is an axial displacement restricting mechanism adopted in the fifth embodiment. This axial displacement restricting mechanism 64 is different from the axial displacement restricting mechanism 28 of the first embodiment in that it is provided separately from the rotation restricting mechanism 61. More particularly, in this case, the axial displacement restricting mechanism 64 is constituted by a plural number of (e.g., two) coupling projections (coupling members) 65 which are radially displaceable and provided on the mounting shaft section 15 of the rotational shaft 14, and an annular fitting groove 67 which is provided on the mounting tube section 24 of the rotary atomizing head 21.

In this instance, each one of the coupling projections 65 is formed of a high density metallic material, for example, which is put under the influence of centrifugal force to a greater degree. Further, each one of the coupling projections 65 is constituted, for example, by a columnar pin portion 65A and an annular flange portion 65B provided at a base end of the pin portion 65A. A fore distal end of the pin portion 65A is rounded off by chamfering, for example, to provide a larger contacting surface area with an inclined bottom surface 67A which will be described in greater detail hereinafter.

On the other hand, a plural number of (e.g., two) projection accommodating holes 66 are provided around the outer peripheral side of the tubular portion 15A of the mounting shaft section 15 at uniform intervals in the circumferential direction at a position on the front side of the male spline member 62 to accommodate the coupling projections 65. In this instance, a plural number of the projection accommodating holes 66 are provided in the same axial positions in confronting relation with the annular fitting grooves 67, respectively. Further, the projection accommodating holes 66 are provided at uniform intervals in the circumferential direction of the rotational shaft 14. Each one of the projection accommodating holes 66 is in the form of a bottomed radial hole of a circular shape in cross section, and an inside diameter thereof is set to be, for example, larger than the outside diameter of the flange portion 65B of the coupling projection 65. Thus, each coupling projection 65 is radially displaceable within the projection accommodating hole 66.

Further, a lid member 66A is provided at an opening side of each projection accommodating hole 66. Bored in each lid member 66A is an insertion hole 66B of a diameter which is larger than the pin portion 65A but smaller than the flange portion 65B. Thus, the pin portion 65A of each coupling projection 65 is protrudable out of the projection accommodating hole 66 through the insertion hole 66B, but the flange portion 65B of the coupling projection 65 is prohibited by interference of the lid member 66A. Thus, the lid member 66A functions to prevent the coupling projection 65 from totally coming out of the projection accommodating hole 66.

On the other hand, a fitting groove 67 constituting part of the axial displacement restricting mechanism 64 is provided on the inner peripheral surface of the mounting tube section 24. In this instance, the fitting groove 67 is located in such a position that comes to confronting relation with the coupling projections 65 when the rotary atomizing head 21 is mounted on the rotational shaft 14. Further, the fitting groove 67 is formed as an annular groove of a square shape in cross section, extending in the circumferential direction around the inner peripheral surface of the fitting hole 24A. When the coupling projection 65 is displaced radially outward, each pin portion 65A of the coupling projection 65 is urged to intrude and brought into engagement with the fitting groove 67. Thus, the coupling projection 65 and the fitting groove 67 can restrict axial displacements of the rotary atomizing head 21.

Further, indicated at 68 is an axial aligning mechanism which is constituted integrally with the axial displacement restricting mechanism 64.

In this instance, with regard to the axial aligning mechanism 68, the fitting groove 67 is arranged to have a greater groove width as compared with the outside diameter of the pin portions 65A in order to permit intrusion of the latter. Further, an inclined bottom surface 67A which is formed in such a way that the groove depth gets shallower gradually from a deepest portion toward an opening side of the mounting tube section 24 is provided at the bottom portion of the fitting groove 67. The fitting groove 67 is arranged to have such a groove depth as to permit fore distal ends of the coupling projections 65 to come into contact with the inclined bottom surface 67A. Thus, the axial aligning mechanism 68 is constituted by the coupling projections 65 and the inclined bottom surface 67A of the fitting groove 67 thereby to bring a center axis of the rotary atomizing head 21 into alignment with a center axis of the rotational shaft 14.

Figure 13:
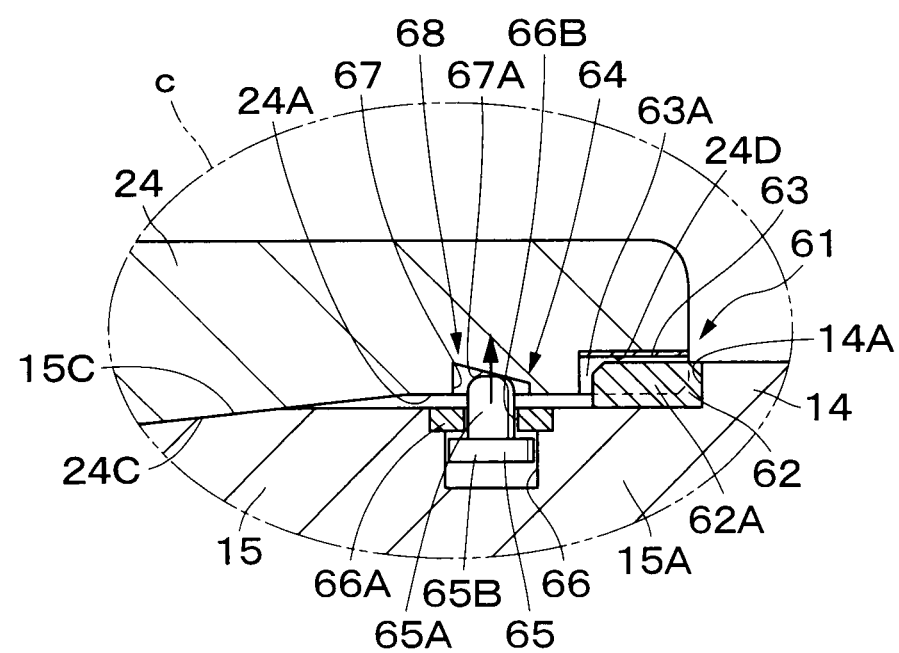
FIG. 13 is an enlarged sectional view showing the rotation restricting mechanism when the rotational shaft is in rotation, taken in the same position as FIG. 12.
Figure 14:
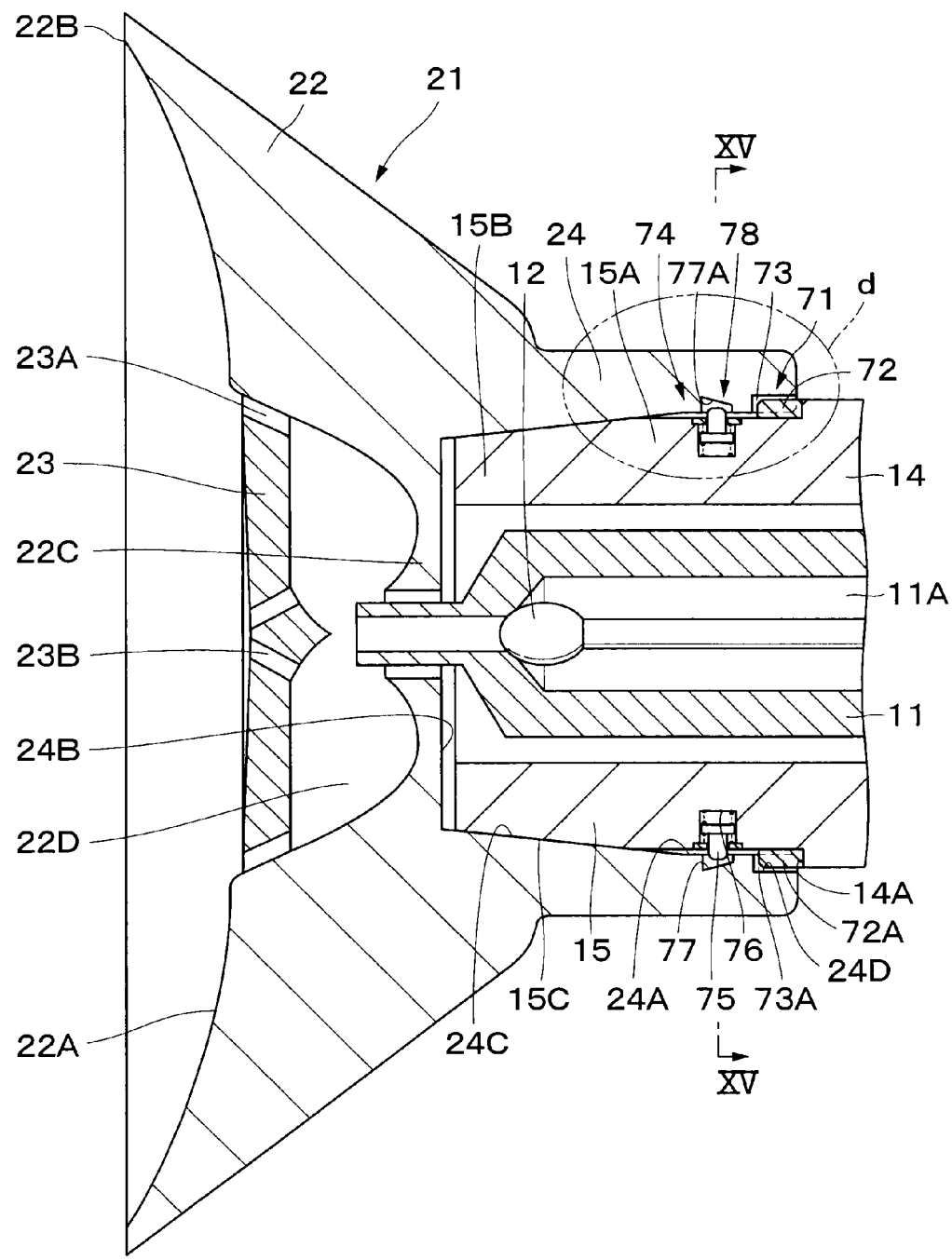
FIG. 14 is a longitudinal sectional view showing a rotational shaft and a rotary atomizing head according to a sixth embodiment of the invention.
Figure 15:
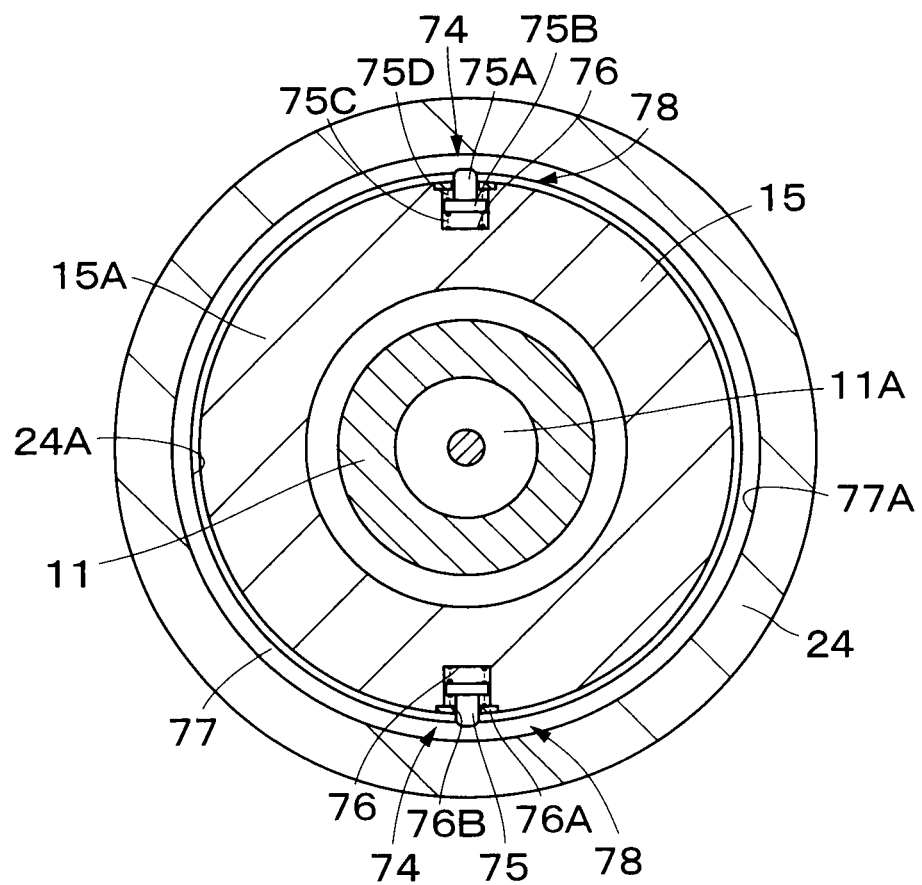
FIG. 15 is a cross-sectional view of a rotation restricting mechanism taken from the direction of arrows XV-XV in FIG. 14.

More particularly, the axial aligning mechanism 68 functions in the manner as follows. As the rotational shaft 14 is rotationally driven in high speed, for example, at a speed of 3,000 to 150,000 rpm, the coupling projections 65 are shifted radially outward under the influence of centrifugal force as shown in FIG. 13. At this time, the pin portion 65A of each coupling projection 65 is forcibly pushed against the inclined bottom surface 67A of the fitting groove 67, generating an axial component of force at a point of contact between the pin portion 65A and the inclined bottom surface 67A to push the rotary atomizing head 21 in the direction toward the base end side of the rotational shaft 14 (toward the air motor 13). As a result, the inclined inner peripheral surface 24C of the rotary atomizing head 21 is biased toward the inclined outer peripheral surface 15C of the rotational shaft 14 to bring the center axis of the rotary atomizing head 21 into alignment with that of the rotational shaft 14.

Thus, the above-described fifth embodiment can obtain substantially the same operational effects as the foregoing first embodiment. Especially in the case of the fifth embodiment, the axial displacement restricting mechanism 64 is constituted by the coupling projections 65 which are provided on the outer peripheral side of the mounting shaft section 15 of the rotational shaft 14, and the fitting groove 67 which is provided on the inner peripheral side of the mounting tube section 24 of the rotary atomizing head 21. Therefore, axial displacements of the rotary atomizing head 21 relative to the rotational shaft 14 can be restricted by intrusion of the coupling projections 65 into the fitting groove 67.

In addition, the axial aligning mechanism 68 is constituted by the coupling projections 65 and the inclined bottom surface 67A provided at the bottom portion of the fitting groove 67. When the rotational shaft 14 is put in high speed rotation, the coupling projections 65 are protrude in a radially outward direction under the influence of centrifugal force and the fore distal ends of the coupling projections 65 abut against the inclined bottom surface 67A of the fitting groove 67. Therefore, by a component of force which is generated at a point of contact between the pin portion 65A of each coupling projection 65 and the inclined bottom surface 67A, the rotary atomizing head 21 is biased in a direction toward the base end of the rotational shaft 14 (toward the air motor 13). As a consequence, the inclined inner peripheral surface 24C of the rotary atomizing head 21 is pushed toward the inclined outer peripheral surface 15C of the rotational shaft 14 to bring the center axis of the rotary atomizing head 21 into alignment with that of the rotational shaft 14.

In this instance, the inclined outer peripheral surface 15C of the rotational shaft 14 and the inclined inner peripheral surface 24C of the main atomizing body 22 are intimately abutted against each other to maintain the rotary atomizing head 21 securely in an aligned state.

Further, in this regard, in a case where a resilient ring of the mounting shaft section 15 is held in contact with an inclined surface of the mounting tube section 24, for example, as in Patent Literature 5, the resilient ring tends to contract in a radially inward direction instead of being forcibly pushed against an inclined surface under the influence of centrifugal force. In contrast, in the fifth embodiment of the invention, a plural number of the coupling projections 65 are provided separately from each other on the rotational shaft 14 respectively. Therefore, the coupling projections 65 can be easily and independently displaced in a radially outward direction at the time of being under the influence of centrifugal force.

As a result, in the case of the fifth embodiment described above, a biasing force of biasing the inclined inner peripheral surface 24C of the rotary atomizing head 21 toward the inclined outer peripheral surface 15C of the rotational shaft 14 is easily augmented in proportion to the rotational speed. Accordingly, the rotary atomizing head 21 can be fixed on the rotational shaft 14 in a state where a center axis of the rotary atomizing head 21 is exactly in alignment with that of the rotational shaft 14. Therefore, the rotational shaft 14 can be put in rotation in a stabilized state to prevent damages to the rotational shaft 14 or to the static air bearing 13C.

Further, in a case where a resilient ring of amounting shaft section 15 is held in contact with an inclined surface of amounting tube section 24, for example, as in Patent Literature 5 mentioned above, it is very likely that twisting and abrasion occur to the resilient ring at the time of mounting or dismantling the rotary atomizing head 21. In contrast, in the above-described fifth embodiment of the invention, the coupling projections 65 which is radially displaceable is provided on the rotational shaft 14. Accordingly, the coupling projections 65 are accommodated into the projection accommodating holes 66 of the rotational shaft 14 at the time of mounting or dismantling the rotary atomizing head 21, thus suppressing abrasive wear to guarantee higher durability and reliability of the machine.

Now, turning to FIGS. 14 to 17, there is shown a sixth embodiment of the invention. The sixth embodiment has features in that an axial displacement restricting mechanism is constituted by coupling projections and a fitting groove, and spring members which are adapted to bias in a radially outward direction are attached to the coupling projections. In the following description of the sixth embodiment, those component parts which are identical with counterparts in the foregoing first embodiment are simply designated by the same reference numerals to avoid repetitions of similar explanations.

Indicated at 71 is a rotation restricting mechanism adopted in the sixth embodiment. Substantially in the same way as the rotation restricting mechanism 31 of the second embodiment, this rotation restricting mechanism 71 is constituted by a male spline member 72 which is composed of a plural number of spline teeth 72A provided around the outer peripheral side of a mounting shaft section 15 of a rotational shaft 14, and a female spline member 73 which is composed of a plural number of spline teeth 73A provided around the inner peripheral side of a mounting tube section 24 of a rotary atomizing head 21.

Denoted at 74 is an axial displacement restricting mechanism adopted in the sixth embodiment. This axial displacement restricting mechanism 74 is provided with coupling projections (coupling members) 75 and a fitting groove 77 which are substantially the same as the coupling projections 65 and fitting groove 67 in the fifth embodiment. Each coupling projection 75 is composed of a columnar pin portion 75A, for example, and an annular flange portion 75B which is provided at a base end of the pin portion 75A.

Each one of the coupling projection 75 is accommodated in a projection accommodating hole 76 which is bored in a tubular portion 15A of the mounting shaft section 15. In this case, the respective projection accommodating holes 76 are in the form of a bottomed radial hole of a circular shape in cross section and are provided at a plural number of positions (e.g., at two positions) in confronting relation with an annular fitting groove 77. Namely, a plural number of projection accommodating holes 76 are located at uniform intervals in the circumferential direction of the rotational shaft 14. Further, a lid member 76A is provided at an opening side of each projection accommodating hole 76, and an insertion hole 76B which permits protrusion of the pin portion 75A therethrough is provided in the lid member 76A.

On the other hand, a first spring member 75C in the form of a coil spring or the like is provided between the flange portion 75B of the coupling projection 75 and a bottom surface of the projection accommodating hole 76 thereby to bias the coupling projection 75 in a radially outward direction (in a direction of protruding out of the projection accommodating hole 76). On the other hand, a second spring member 75D in the form of a coil spring or the like is provided around the pin portion 75A between the flange portion 75B of the coupling projection 75 and the lid member 76A of the projection accommodating hole 76 thereby to bias the coupling projection 75 in a radially inward direction (in a direction of intruding into the projection accommodating hole 76).

Figure 16:
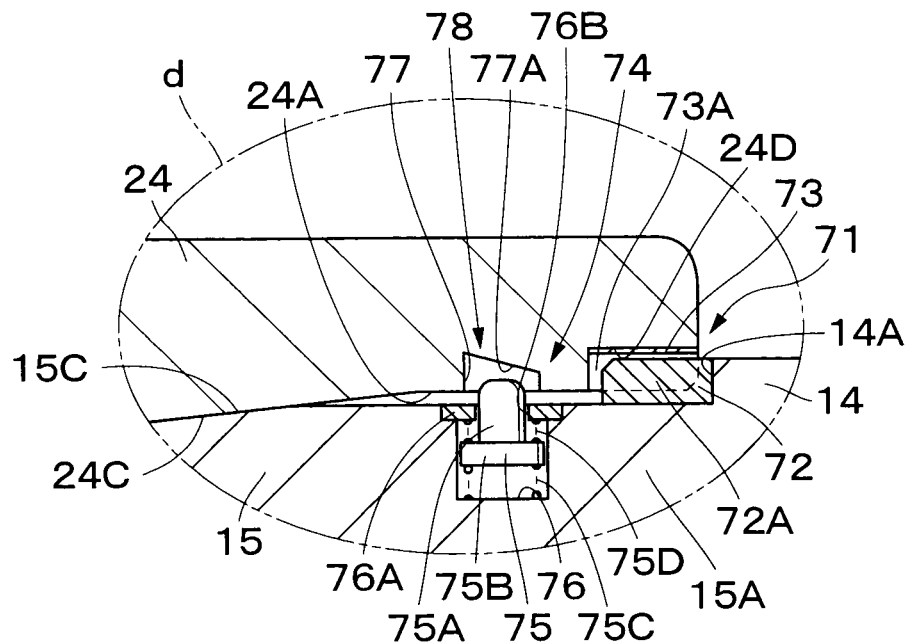
FIG. 16 is an enlarged sectional view of the rotation restricting mechanism in a demarcated area d in FIG. 14.
Figure 17:
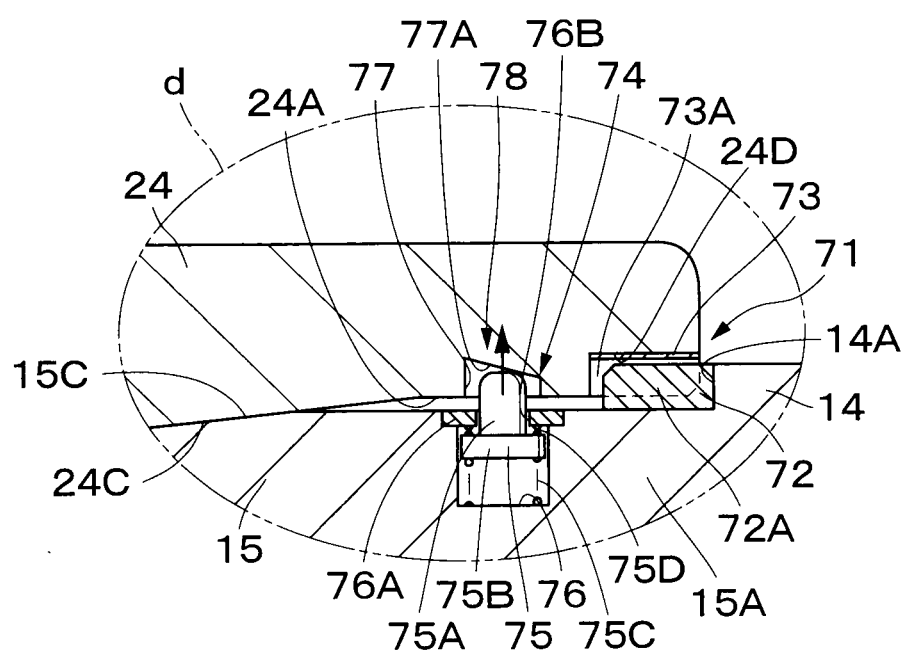
FIG. 17 is an enlarged sectional view showing the rotation restricting mechanism when the rotational shaft is in rotation, taken in the same position as FIG. 16.

Thus, when the rotational shaft 14 is not in rotation, each coupling projection 75 is retained in a position where the two spring members 75C and 75D are balanced as shown in FIG. 16, with the pin portion 75A projected slightly out of the projection accommodating hole 76. When the rotational shaft 14 is put in high speed rotation, the coupling projection 75 is displaced radially outward under the influence of centrifugal force against the action of the second spring member 75D as shown in FIG. 17.

On the other hand, a fitting groove 77 is bored in the inner peripheral side of the mounting tube section 24. In this case, the fitting groove 77 is formed by an indented groove of a square shape in cross section, for example, and formed in an annular shape extending in the circumferential direction around the inner peripheral surface of the fitting hole 24A. As the coupling projection 75 is displaced radially outward, the pin portion 75A of the coupling projection 75 is urged to intrude into and engage with the fitting groove 77. Thus, the coupling projection 75 and the fitting groove 77 can restrict the axial displacements of the rotary atomizing head 21.

Further, designated at 78 is an axial aligning mechanism which is constituted integrally with the axial displacement restricting mechanism 74. Namely, an inclined bottom surface 77A is formed at the bottom portion of the fitting groove 77 in such a way that the groove depth gets shallower gradually from a deepest portion toward an opening side of the mounting tube section 24. In this instance, the inclined bottom surface 77A is brought into contact with the fore distal end portion of each coupling projection 75. Thus, the axial aligning mechanism 78 which is arranged to align the center axis of the rotary atomizing head 21 with that of the rotational shaft 14 is constituted by the coupling projections 75 and the inclined bottom surface 77A of the fitting groove 77.

Thus, the above-described sixth embodiment can obtain substantially the same operational effects as the foregoing first and fifth embodiments. Especially in the case of the sixth embodiment, the first spring member 75C is provided on each coupling projection 75, and the coupling projection 75 is adapted to be biased in a radially outward direction by means of the first spring member 75C. Accordingly, no matter whether the rotational shaft 14 is in rotation, fore distal ends of the respective coupling projections 75 are urged to intrude into the fitting groove 77, letting the coupling projections 75 fit into the fitting groove 77 more securely at the time of mounting the rotary atomizing head 21 on the rotational shaft 14 to fix the rotary atomizing head 21 in a retained state.

In this connection, in a case where the first and second spring members 75C and 75D are not present as in the foregoing fifth embodiment, there may arise a situation as follows. In that case, if the length of protrusion of the coupling projections 75 as well as the groove depth of the fitting groove 77 is increased, the coupling projections 75 are dropped into the fitting groove 77 deeply. Thus, it might be difficult to disengage the coupling projection 75 from the fitting groove 77 at the time of dismantling the rotary atomizing head 21.

In contrast, in the case of the present embodiment, the second spring member 75D is provided on each coupling projection 75, and the coupling projection 75 is adapted to be biased in a radially inward direction by means of the second spring member 75D. Therefore, when the rotational shaft 14 comes to a stop, the coupling projections 75 can be prevented from protruding from the projection accommodating hole 76 to an excessive degree. Thus, at the time of mounting or dismantling the rotary atomizing head 21, the fore distal end of the coupling projections 75 are allowed to get into the fitting groove 77 but short of and out of contact with the inclined bottom surface 77A. Therefore, the coupling projections 75 can be easily pulled out from the fitting groove 77 simply by extracting the rotary atomizing head 21 from the rotational shaft 14, enhancing the efficiency of mounting and dismantling jobs of the rotary atomizing head 21.

In addition, as compared with the foregoing fifth embodiment without the first and second spring members 75C and 75D, it becomes possible to increase the degree of radial displacement (stroke length) of the coupling projections 75. Accordingly, the groove depth of the fitting groove 77 can be increased for the purpose of enhancing its retaining effects against the rotary atomizing head 21 in a rotating state.

Figure 18:
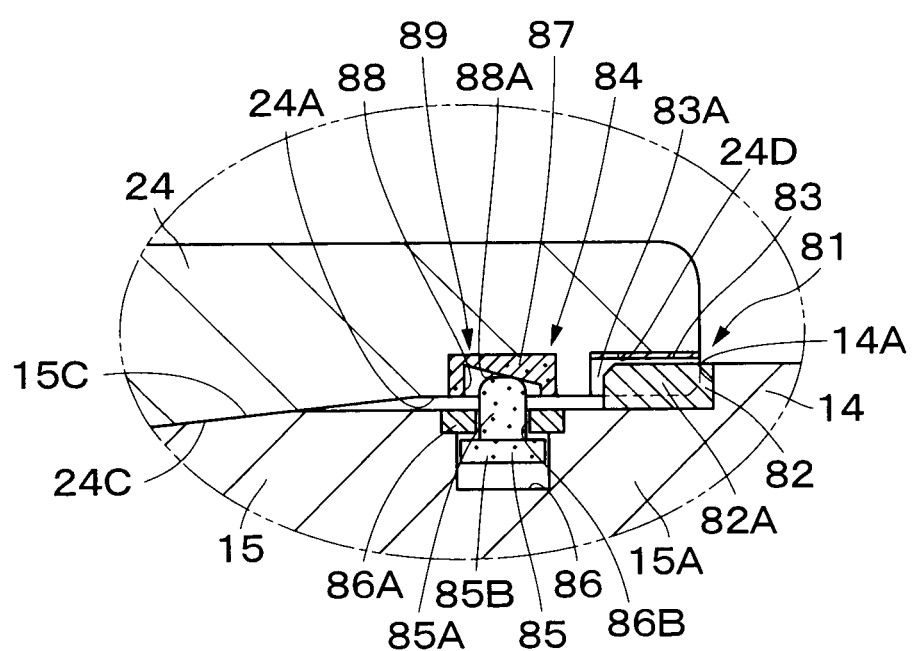
FIG. 18 is an enlarged sectional view showing a rotation restricting mechanism according to a seventh embodiment of the invention, taken in the same position as FIG. 4.

Now, turning to FIG. 18, there is shown a seventh embodiment of the invention. This seventh embodiment has features in that an axial displacement restricting mechanism is constituted by coupling projections and a fitting groove which are attracted toward each other by magnetic force. In the following description of the seventh embodiment, those component parts which are identical with counterparts in the foregoing first embodiment are simply designated by the same reference numerals to avoid repetitions of similar explanations.

Indicated at 81 is a rotation restricting mechanism adopted in the seventh embodiment. Substantially in the same way as the rotation restricting mechanism 31 in the second embodiment, the rotation restricting mechanism 81 is constituted by a male spline member 82 which is composed of a plural number of spline teeth 82A provided on the outer peripheral side of a mounting shaft section 15 of a rotational shaft 14, and a female spline member 83 which is composed of a plural number of spline teeth 83A provided on the inner peripheral side of a mounting tube section 24 of a rotary atomizing head 21.

Denoted at 84 is an axial displacement restricting mechanism adopted in the seventh embodiment. This axial displacement restricting mechanism 84 is provided with coupling projections (coupling members) 85 and a fitting groove 88 similar to the coupling projection 65 and fitting groove 67 in the above-described fifth embodiment, respectively. Each one of the coupling projections 85 and the fitting groove 88 are arranged to be attracted toward each other by magnetic force. More particularly, the coupling projections 85 are formed of a magnetic material with magnetic force like a permanent magnet. On the other hand, as described hereinafter, the fitting groove 88 is formed by the use of a magnetic member 87, for example, a ferrous magnetic material, so that magnetic attracting force takes place between each one of the coupling projection 85 and the fitting groove 88.

In this instance, each one of the coupling projections 85 is constituted by a columnar pin portion 85A, for example, and an annular flange portion 85B which is provided at a base end of the pin portion 85A. Further, each one of the coupling projections 85 is accommodated in a projection accommodating hole 86 which is bored in a tubular portion 15A of a mounting shaft section 15. In this instance, the projection accommodating hole 86 is a bottomed radial hole of a circular shape in cross section, and is provided at a plural number of positions (e.g., at two positions) in confronting relation with the annular fitting groove 88. A plural number of the projection accommodating hole 86 are located at uniform intervals in the circumferential direction of the rotational shaft 14. Further, a lid member 86A is provided at an opening side of each projection accommodating hole 86, and an insertion hole 86B which permits protrusion of the pin portion 85A therethrough is provided in the lid member 86A.

On the other hand, an annular magnetic member 87 is embedded in the inner peripheral side of the mounting tube section 24 at a confronting position relative to the projection accommodating holes 86. This magnetic member 87 is formed of a ferrous magnetic material, for example. The above-described fitting groove 88 is formed on the inner peripheral side of the magnetic member 87.

Further, the fitting groove 88 is formed by an indented groove of a square shape in cross section, and formed in an annular shape extending in the circumferential direction around the inner peripheral surface of a fitting hole 24A. As the coupling projections 85 are displaced radially outward, the respective pin portions 85A are urged to intrude into the fitting groove 88. Thus, the coupling projections 85 and the fitting groove 88 can restrict axial displacements of the rotary atomizing head 21.

Designated at 89 is an axial aligning mechanism, which is constituted integrally with the axial displacement restricting mechanism 84. Namely, an inclined bottom surface 88A is formed at the bottom portion of the fitting groove 88 in such a way that the groove depth gets shallower gradually from a deepest portion toward an opening side of the mounting tube section 24. In this instance, the inclined bottom surface 88A is brought into contact with the fore distal end portions of the coupling projections 85. Thus, the axial aligning mechanism 89 which is arranged to align the center axis of the rotary atomizing head 21 with that of the rotational shaft 14 is constituted by the coupling projections 85 and the inclined bottom surface 88A of the fitting groove 88.

Thus, the above-described seventh embodiment can obtain substantially the same operational effects as the foregoing first and fifth embodiments. Especially in the seventh embodiment, the coupling projections 85 and the fitting groove 88 are attracted toward each other by magnetic force. Therefore, the coupling projections 85 can be shifted toward the fitting groove 88 by magnetic force. Accordingly, no matter whether the rotational shaft 14 is in rotation, fore distal ends of the coupling projections 85 are urged to intrude into the fitting groove 88. Therefore, the coupling projections 85 can be securely fitted in the fitting groove 88 at the time of mounting the rotary atomizing head 21 on the rotational shaft 14 to fix the rotary atomizing head 21 in a retained state.

Figure 19:
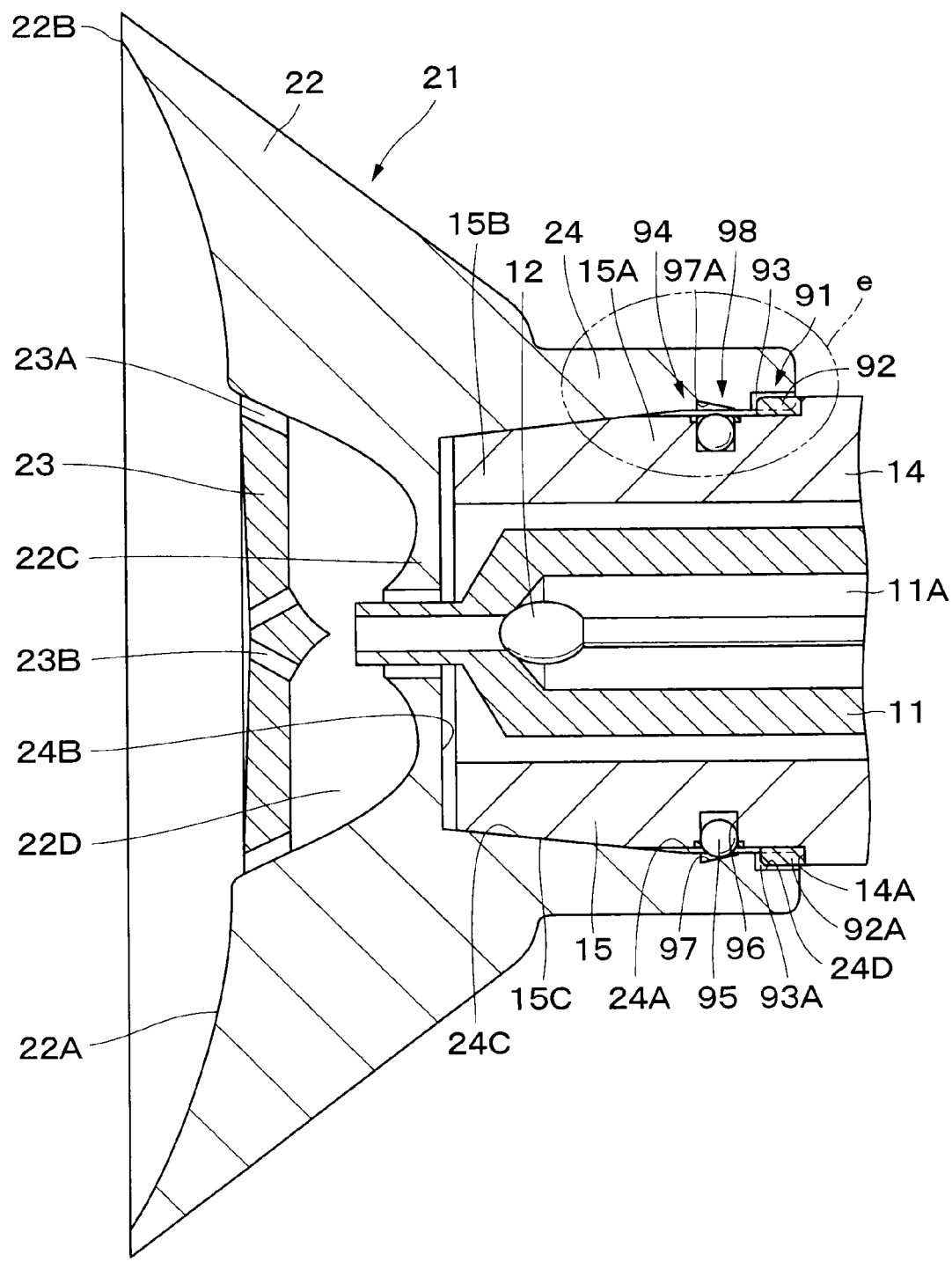
FIG. 19 is a longitudinal sectional view showing a rotational shaft and a rotary atomizing head according to an eighth embodiment of the invention.
Figure 20:
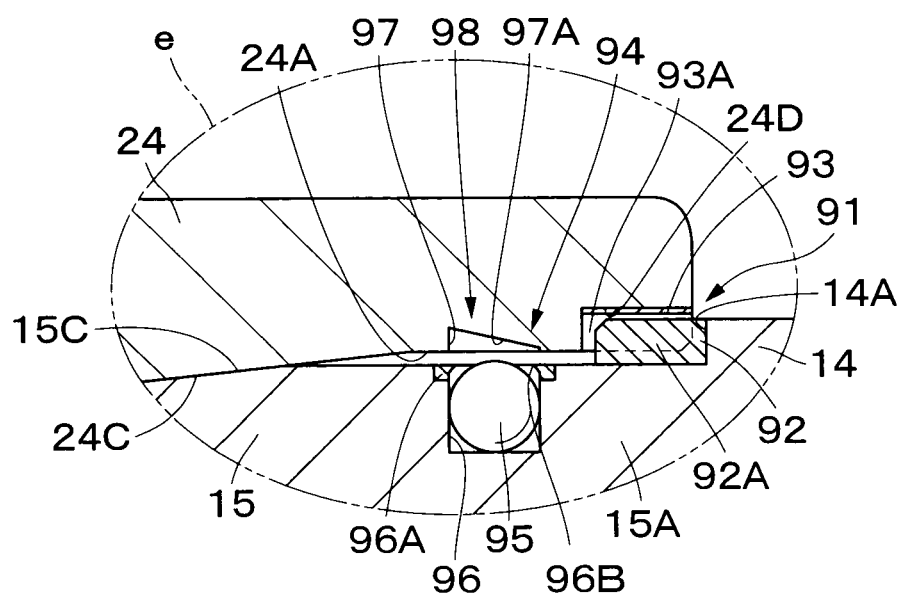
FIG. 20 is an enlarged sectional view of a rotation restricting mechanism in a demarcated area e in FIG. 19.

Now, turning to FIGS. 19 and 20, there is shown an eighth embodiment of the invention. The eighth embodiment has features in that an axial displacement restricting mechanism is constituted by coupling balls and a fitting groove, and an axial aligning mechanism is constituted by an inclined bottom surface which is provided at the bottom portion of the fitting groove. In the following description of the eighth embodiment, those component parts which are identical with counterparts in the foregoing first embodiment are simply designated by the same reference numerals to avoid repetitions of similar explanations.

Indicated at 91 is a rotation restricting mechanism adopted in the eighth embodiment. Substantially in the same way as the rotation restricting mechanism 31 in the second embodiment, this rotation restricting mechanism 91 is constituted by a male spline member 92 which is composed of a plural number of spline teeth 92A provided on the outer peripheral side of a mounting shaft section 15 of a rotational shaft 14, and a female spline member 93 which is composed of a plural number of spline teeth 93A provided on the inner peripheral side of a mounting tube section 24 of a rotary atomizing head 21.

Denoted at 94 is an axial displacement restricting mechanism adopted in the eighth embodiment. This axial displacement restricting mechanism 94 is constituted by a plural number (e.g., two) of coupling balls (coupling members) 95, which are radially displaceably provided on the mounting shaft section 15 of the rotational shaft 14, and an annular fitting groove 97 which is provided on the mounting tube section 24 of the rotary atomizing head 21.

The coupling balls 95 are formed of, for example, a metallic material and accommodated in ball accommodating holes 96 which are bored on the tubular portion 15A of the mounting shaft section 15. In this instance, the ball accommodating holes 96 are in the form of a bottomed radial hole of a circular shape in cross section, and are located at a plural number of positions (e.g., at two positions) in confronting relation with the annular fitting groove 97.

The ball accommodating holes 96 are located at uniform intervals in the circumferential direction of the rotational shaft 14. An inside diameter of the ball accommodating hole 96 is set to be larger than the outside diameter of the coupling ball 95. Further, a lid member 96A is provided at an opening side of each ball accommodating hole 96, the lid member 96A being provided with an insertion hole 96B of a smaller diameter as compared with the outside diameter of the coupling ball 95. Thus, through the insertion hole 96B, part of the coupling ball 95 is allowed to protrude out of the ball accommodating hole 96.

On the other hand, the fitting groove 97 is bored into the inner peripheral side of the mounting tube section 24. In this case, the fitting groove 97 is formed by an indented groove of a square shape in cross section, and formed in an annular shape extending in the circumferential direction around the inner peripheral surface of the fitting hole 24A. When the coupling balls 95 are displaced radially outward, part of each coupling ball 95 is urged to intrude into and engage with the fitting groove 97. Thus, the coupling balls 95 and the fitting groove 97 can restrict the axial displacement of the rotary atomizing head 21.

Indicated at 98 is an axial aligning mechanism which is constituted integrally with the axial displacement restricting mechanism 94. Namely, an inclined bottom surface 97A is formed at the bottom portion of the fitting groove 97 in such a way that the groove depth gets shallower gradually from a deepest portion toward an opening side of the mounting tube section 24. In this instance, the inclined bottom surface 97A is brought into contact with a protruded portion of each coupling ball 95. Thus, an axial aligning mechanism 98 which is arranged to align the center axis of the rotary atomizing head 21 with that of the rotational shaft 14 is constituted by the coupling balls 95 and the inclined bottom surface 97A of the fitting groove 97.

Likewise, the above-described eighth embodiment can obtain substantially the same operational effects as the foregoing first and fifth embodiments. Especially in the case of the eighth embodiment employing the axial displacement restricting mechanism 94 which is constituted by the coupling balls 95 and the fitting groove 97, the axial displacements of the rotary atomizing head 21 relative to the rotational shaft 14 can be restricted by the intrusion of the coupling balls 95 into the fitting groove 97.

Further, in this case, the axial aligning mechanism 98 is constituted by the inclined bottom surface 97A which is provided at the bottom portion of the fitting groove 97. Therefore, as the coupling balls 95 are protruded radially outward under the influence of centrifugal force of rotation, the fore distal ends of the respective coupling balls 95 are abutted against the inclined bottom surface 97A of the fitting groove 97. At this time, by a component of force which is generated at a point of contact between each coupling ball 95 and the inclined bottom surface 97A, the rotary atomizing head 21 is pushed against the rotational shaft 14, biasing an inclined inner peripheral surface 24C of the rotary atomizing head 21 toward an inclined outer peripheral surface 15C of the rotational shaft 14 in such a way to bring a center axis of the rotary atomizing head 21 into alignment with that of the rotational shaft 14.

Figure 21:
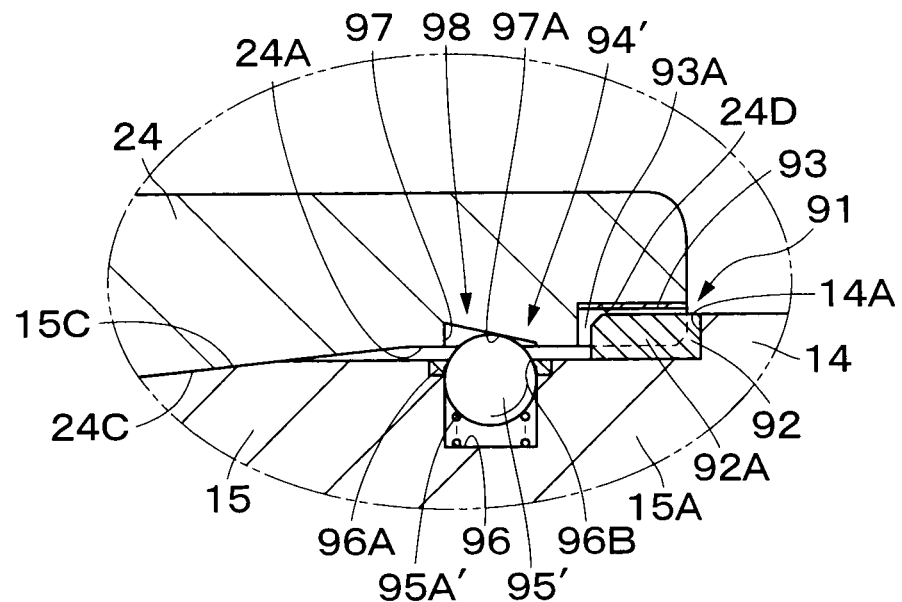
FIG. 21 is an enlarged sectional view showing a rotation restricting mechanism according to a first modification of the invention, taken in the same position as FIG. 20.

In the above-described eighth embodiment, by way of example the coupling balls 95 of the axial displacement restricting mechanism 94 are adapted to be displaced only when they are put under the influence of centrifugal force. However, the present invention is not limited to this particular example. For instance, like an axial displacement restricting mechanism 94' of a first modification shown in FIG. 21, a spring member 95A' may be interposed between a coupling ball 95' and a bottom surface of the ball accommodating hole 96 thereby to bias the coupling ball 95' toward a lid member 96A.

Figure 22:
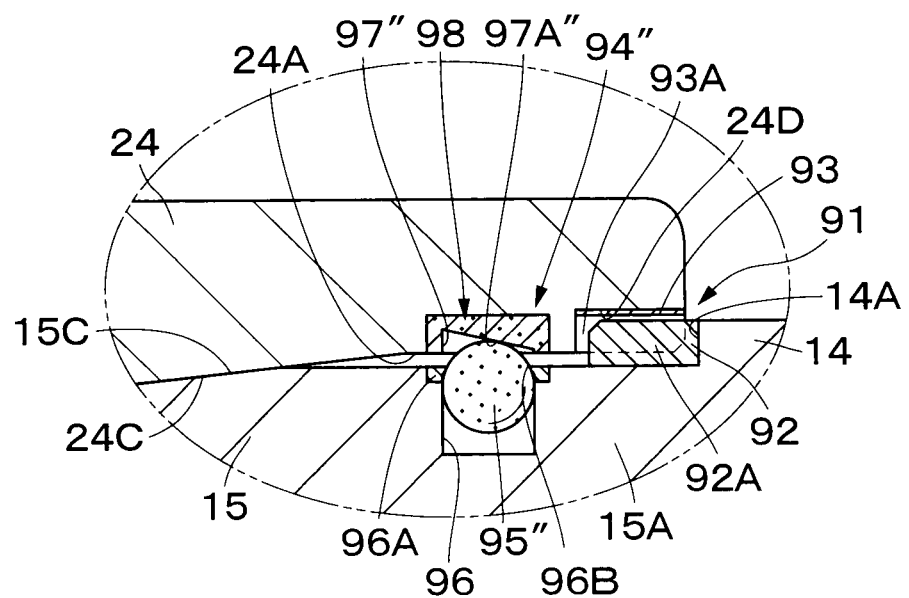
FIG. 22 is an enlarged sectional view showing a rotation restricting mechanism according to a second modification of the invention, taken in the same position as FIG. 20.
Figure 23:
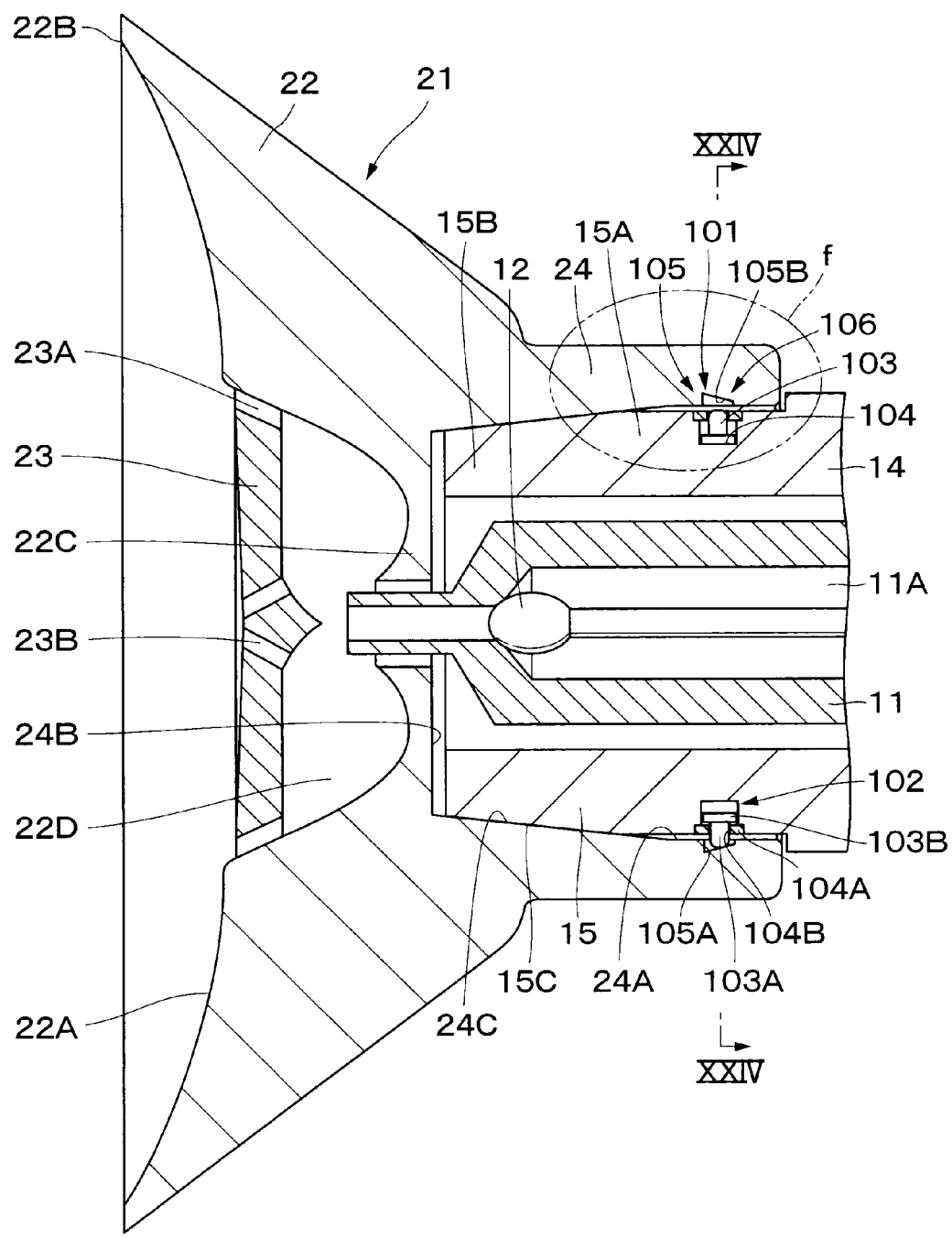
FIG. 23 is a longitudinal sectional view showing a rotational shaft and a rotary atomizing head according to a ninth embodiment of the invention.
Figure 24:
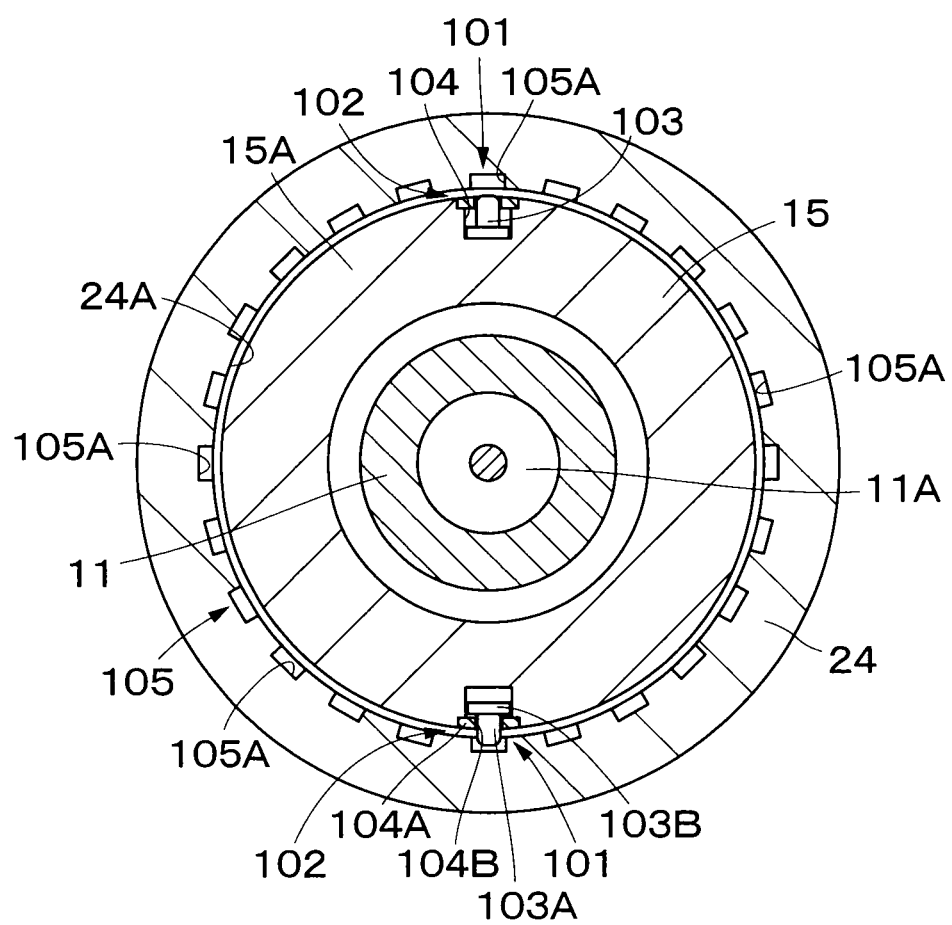
FIG. 24 is a cross-sectional view of a rotation restricting mechanism taken from the direction of arrows XXIV-XXIV in FIG. 23.
Figure 25:
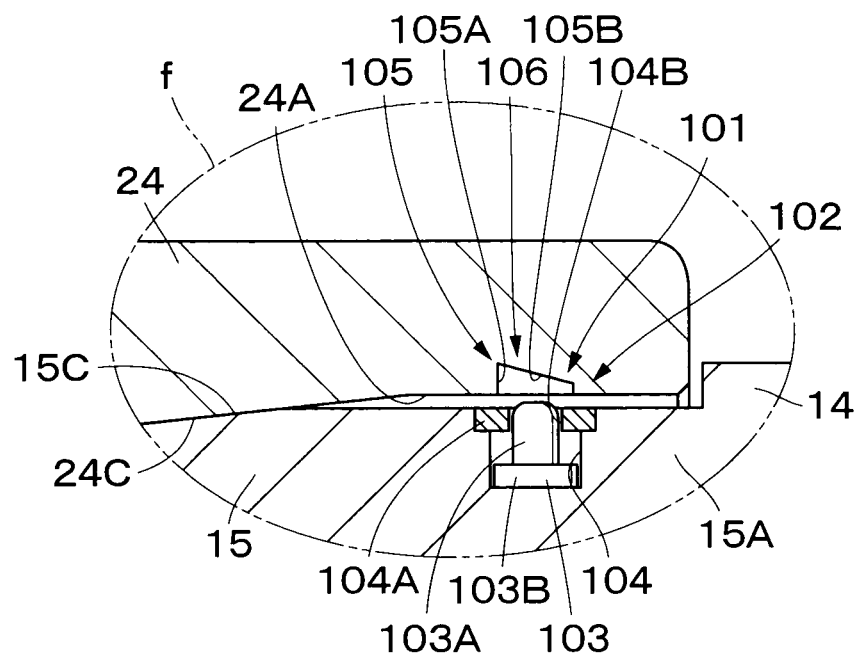
FIG. 25 is an enlarged sectional view of a rotation restricting mechanism in a demarcated area f in FIG. 23.
Figure 26:
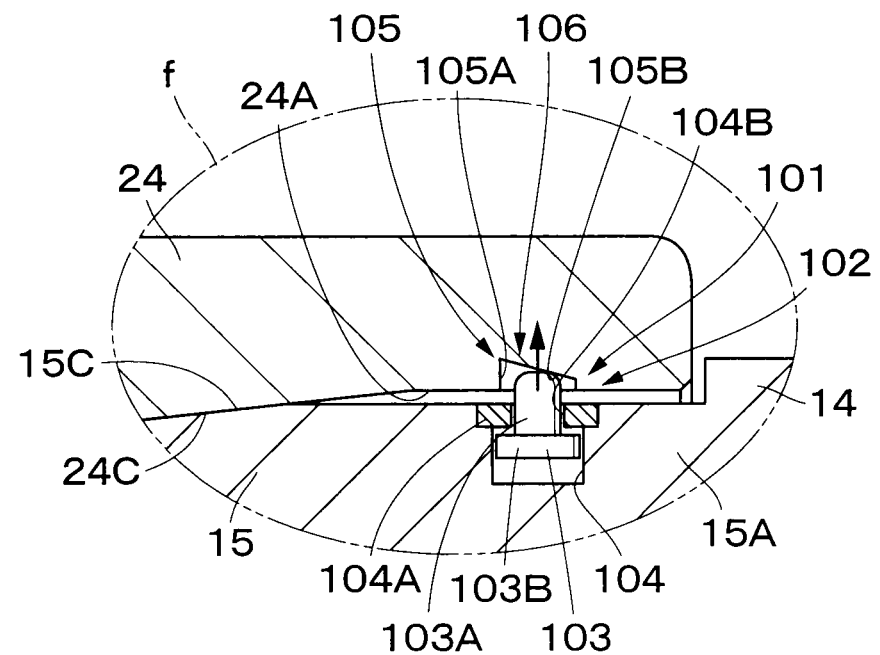
FIG. 26 is an enlarged sectional view showing the rotation restricting mechanism when the rotational shaft is in rotation, taken in the same position as FIG. 25.

Further, arrangements may be made like an axial displacement restricting mechanism 94" of a second modification shown in FIG. 22. More particularly, each of the coupling balls 95" is formed of a magnetic material with magnetic force like a permanent magnet while a fitting groove 97" is formed of a magnetic material so that the coupling ball 95" and fitting groove 97" are magnetically attracted toward each other.

Now, turning to FIGS. 23 to 26, there is shown a ninth embodiment of the invention. This ninth embodiment has features in that a rotation restricting mechanism and an axial displacement restricting mechanism are constituted by coupling projections which are provided on a mounting shaft section of a rotational shaft, and fitting portions comprised of a plural number of independent grooves which are provided on a mounting tube section of a rotary atomizing head. In the following description of the ninth embodiment, those component parts which are identical with counterparts in the foregoing first embodiment are simply designated by the same reference numerals to avoid repetitions of similar explanations.

Indicated at 101 and 102 are a rotation restricting mechanism and an axial displacement restricting mechanism adopted in the ninth embodiment, respectively. The rotation restricting mechanism 101 and axial displacement restricting mechanism 102 are constituted by a plural number of coupling projections 103 (e.g., two) which are radially displaceably provided on a mounting shaft section 15 of a rotational shaft 14, and fitting portions 105 comprised of a plural number of independent grooves 105A which are provided on the mounting tube section 24 of the rotary atomizing head 21, as described in greater detail hereinafter. The coupling projections 103 and the fitting portion 105 comprised of the independent grooves 105A are arranged to perform functions of the rotation restricting mechanism 101 and of the axial displacement restricting mechanism 102 as well.

In this instance, similarly to the coupling projections 65 in the fifth embodiment, each one of the coupling projections 103 is constituted by a columnar pin portion 103A, for example, and an annular flange portion 103B which is provided at a base end of the pin portion 103A. Each coupling projection 103 is accommodated in a projection accommodating hole 104 which is bored in a tubular portion 15A of a mounting shaft section 15.

In this instance, the projection accommodating holes 104 are each in the form of a bottomed radial hole and are provided at a plural number of positions (e.g., at two positions) in confronting relation with the fitting portion 105. Further, a plural number of the projection accommodating holes 104 are located at uniform intervals in the circumferential direction of the rotational shaft 14. In addition, a lid member 104A is provided at an opening side of each projection accommodating hole 104, and an insertion hole 104B which permits protrusion of the pin portion 103A therethrough is provided in the lid member 104A.

On the other hand, the fitting portions 105 are constituted by a plural number of independent grooves 105A which are located in series on the inner peripheral side of the mounting tube section 24. These independent grooves 105A are bored discontinuously and independently from each other in the circumferential direction, namely, and located in an annular formation along the circumferential direction. In this instance, the fitting portions 105 are located in such positions which are confronted by the coupling projections 103 when the rotary atomizing head 21 is mounted on the rotational shaft 14. Further, each independent groove 105A of the fitting portions 105 is in the form of a bottomed radial hole, for example, of a square shape in cross section.

When the coupling projections 103 are displaced radially outward, the respective pin portions 103A of the coupling projections 103 are urged to protrude into the independent grooves 105A and the coupling projections 103 are engaged with the latter in a fixed state in both axial and circumferential directions. Thus, the coupling projections 103 and the fitting portions 105 can restrict the displacements of the rotary atomizing head 21 in both circumferential and axial directions relative to the rotational shaft 14.

Further, as compared with the coupling projections 103, the independent grooves 105A are provided in a greater number. Therefore, each coupling projection 103 can fall into engagement with any one of a large number of independent grooves 105A, which happen to be in a confronting position. Thus, the coupling projections 103 can be easily brought to a position which is confronted by one of the independent grooves 105A, permitting to mount the rotary atomizing head 21 in position in an efficient manner.

Denoted at 106 is an axial aligning mechanism which is provided integrally with the rotation restricting mechanism 101 and the axial displacement restricting mechanism 102 described above.

In this instance, the axial aligning mechanism 106 is arranged in the manner as follows. An inclined bottom surface 105B which is formed in such a way that the groove depth gets shallower gradually from a deepest portion toward an opening side of the mounting tube section 24 is provided at the bottom portion of the independent groove 105A. The inclined bottom surface 105B is arranged to come into contact with a fore distal end of the coupling projection 103. Thus, the coupling projections 103 and the inclined bottom surfaces 105B of the independent grooves 105A constitute the axial aligning mechanism 106 which brings a center axis of the rotary atomizing head 21 into alignment with that of the rotational shaft 14.

As described above, the ninth embodiment of the invention can obtain substantially the same operational effects as the foregoing first and fifth embodiments. Especially in the case of the ninth embodiment, displacements of the rotary atomizing head 21 relative to the rotational shaft 14 in both axial and circumferential directions can be restricted by intrusion of the coupling projections 103 into the independent grooves 105A of the fitting portion 105. That is to say, the coupling projections 103 and the fitting portions 105 perform dual functions of the rotation restricting mechanism 101 and of the axial displacement restricting mechanism 102 as well. Therefore, as compared with a case where the rotation restricting mechanism 101 and axial displacement restricting mechanism 102 are provided separately from each other, it becomes possible to downsize the mounting shaft section 15 of the rotational shaft 14 and the mounting tube section 24 of the rotary atomizing head 21 to a more compact form.

Further, the axial aligning mechanism 106 is constituted by the inclined bottom surfaces 105B provided at the bottom portion of the independent grooves 105A. When the coupling projections 103 are protruded radially outward under the influence of centrifugal force of rotation, fore distal ends of the respective coupling projections 103 are abutted against the inclined bottom surfaces 105B of the independent grooves 105A. As a result, by a component of force which is generated at a point of contact between each coupling projection 103 and the inclined bottom surface 105B, the rotary atomizing head 21 is pushed against the rotational shaft 14. Therefore, the inclined inner peripheral surface 24C of the rotary atomizing head 21 is biased toward the inclined outer peripheral surface 15C of the rotational shaft 14, automatically bringing a center axis of the rotary atomizing head 21 into alignment with a center axis of the rotational shaft 14.

Figure 27:
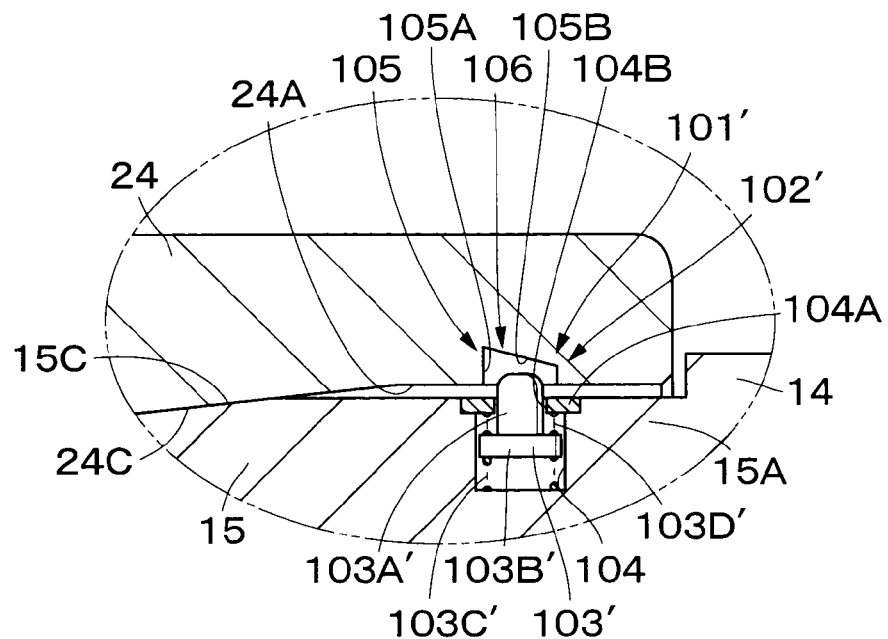
FIG. 27 is an enlarged sectional view showing a rotation restricting mechanism according to a third modification of the invention, taken in the same position as FIG. 25.
Figure 28:
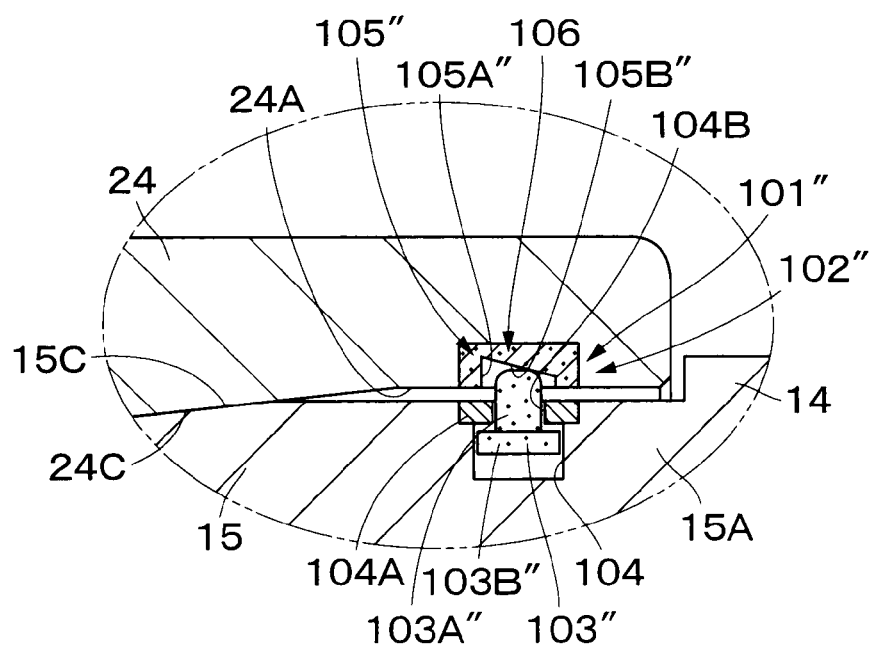
FIG. 28 is an enlarged sectional view showing a rotation restricting mechanism according to a fourth modification of the invention, taken in the same position as FIG. 25.
Figure 29:
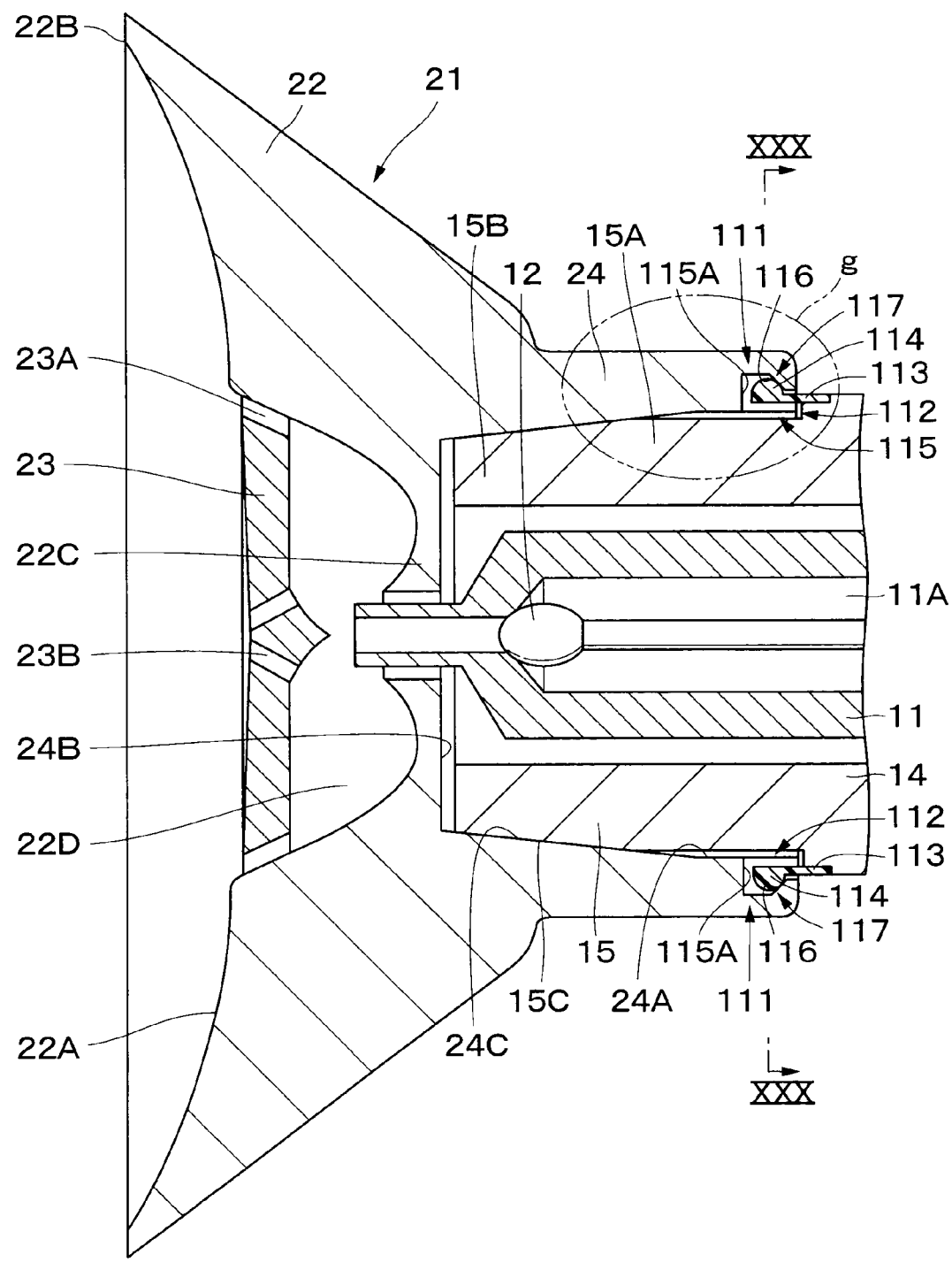
FIG. 29 is a longitudinal sectional view showing a rotational shaft and a rotary atomizing head according to a tenth embodiment of the invention.
Figure 30:
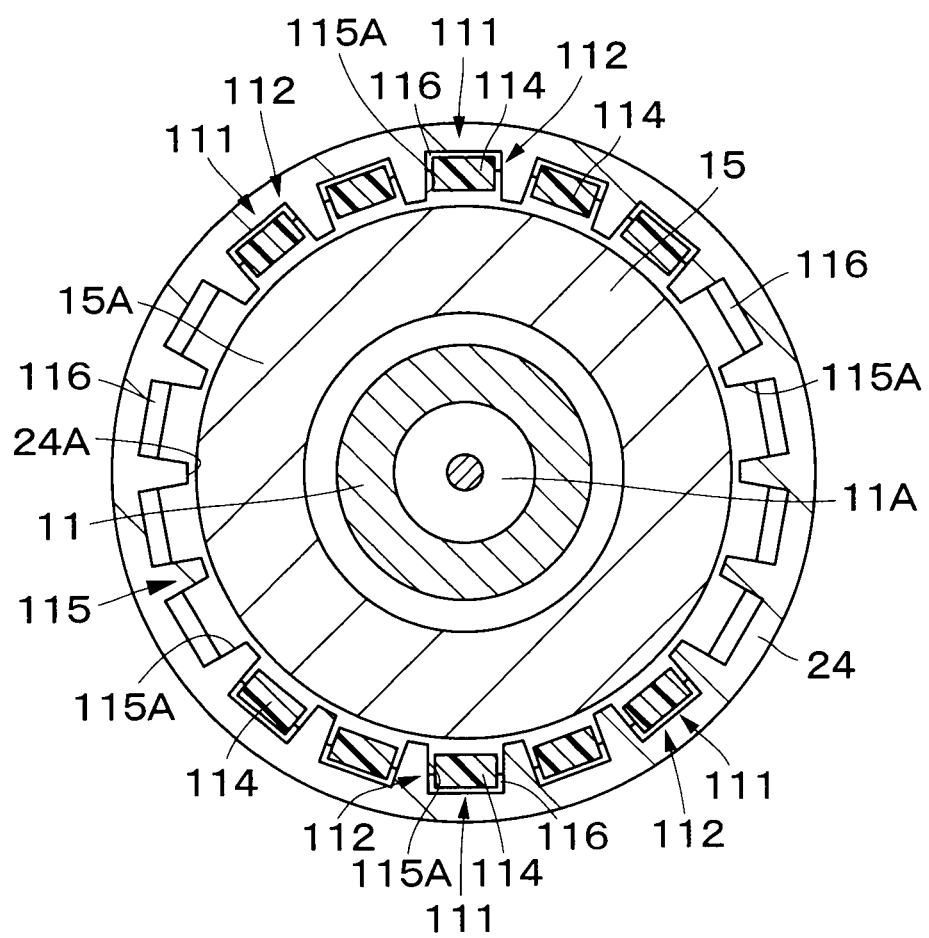
FIG. 30 is a cross-sectional view of a rotation restricting mechanism taken from the direction of arrows XXX-XXX in FIG. 29.

In the above-described ninth embodiment, the rotation restricting mechanism 101 and the axial displacement restricting mechanism 102 are arranged to utilize radially outward displacements of the coupling projections 103 caused by centrifugal force. However, the present invention is not limited to the particular example shown. For instance, like rotation restricting mechanism 101' and axial displacement restricting mechanism 102' in a third modification shown in FIG. 27, first and second spring members 103C' and 103D' may be mounted on coupling projections 103' to bias the coupling projections 103' in a radially outward direction in the same manner as in the foregoing sixth embodiment. Further, like rotation restricting mechanism 101" and axial displacement restricting mechanism 102" in a fourth modification shown in FIG. 28, arrangements may be made such that coupling projections 103" and fitting grooves 105" are attracted toward each other by magnetic force in the same manner as in the seventh embodiment.

Further, in the ninth embodiment shown in FIGS. 23 to 26, the coupling projections 103 are employed as coupling members. However, the coupling balls as in the eighth embodiment of FIG. 19 may be employed as the coupling members if desired. In that case, coupling balls may be biased toward fitting grooves by the use of spring members or by magnetism.

Now, turning to FIGS. 29 to 33, there is shown a tenth embodiment of the invention. This tenth embodiment has features in that rotation restricting mechanism and axial displacement restricting mechanism are constituted by arm members provided on a mounting shaft section of a rotational shaft and provided with free ends at fore distal ends thereof to be flexible in the radial direction, claw members provided on fore distal ends of the respective arm members, and fitting portions which are comprised of a plural number of independent grooves formed in series on a mounting tube section of a rotary atomizing head. In the following description of the tenth embodiment, those component parts which are identical with counterparts in the foregoing first embodiment are simply designated by the same reference numerals to avoid repetitions of similar explanations.

Indicated at 111 and 112 are a rotation restricting mechanism and an axial displacement restricting mechanism according to the tenth embodiment, respectively. The rotation restricting mechanism 111 and axial displacement restricting mechanism 112 are constituted by a plural number of arm members 113 which are provided on a mounting shaft section 15 of a rotational shaft 14, claw members 114 which are provided on fore distal ends of the respective arm members 113, and fitting portions 115 comprised of a plural number of independent grooves 115A formed in series on a mounting tube section 24 of a rotary atomizing head 21.

In the case of the particular embodiment shown, ten arm members 113 in total are provided on the outer peripheral side of a tubular portion 15A, i.e., five on the upper side and five on the lower side. Each one of the arm members 113 is fixed on the outer peripheral surface of the rotational shaft 14 at its base end and extended toward the fore distal end of the rotational shaft 14 at its fore distal end along the axial direction. Each one of the arm members 113 is formed of a flexible metallic or synthetic resin material and its fore free end is radially displaceable by flexure. Attached on a fore distal end of each arm member 113 is a claw member 114 which is formed, for example, in a semi-spherical or semi-circular shape, and projected in a radially outward direction. The claw members 114 provided on the respective arm members 113 are located on the same circumference with each other.

On the other hand, the fitting portions 115 are constituted by a plural number of independent grooves 115A which are located in series on and around the inner peripheral side of the mounting tube section 24. These independent grooves 115A are bored discontinuously and independently from each other in the circumferential direction, and located in an annular formation along the circumferential direction. In this instance, the fitting portions 115 are located in such positions which are confronted by the claw members 114 when the rotary atomizing head 21 is mounted on the rotational shaft 14. Further, each one of the independent grooves 115A of the fitting portions 115 is in the form of a bottomed radial hole of a square shape in cross section, for example.

Figure 33:
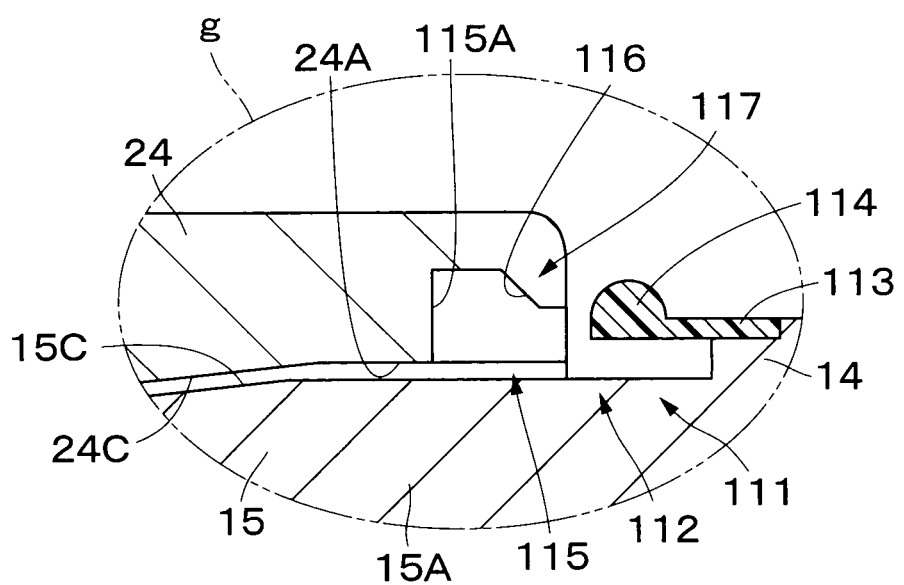
FIG. 33 is an enlarged sectional view showing the rotation restricting mechanism when the rotary atomizing head is dismantled from the rotational shaft, taken in the same position as FIG. 31.

In this instance, the claw members 114 and the independent grooves 115A of the fitting portions 115 are in the following relationship. In the first place, when the rotary atomizing head 21 is dismantled from the rotational shaft 14, the arm members 113 are allowed to stretch out in a substantially axial direction as shown in FIG. 33.

Figure 32:
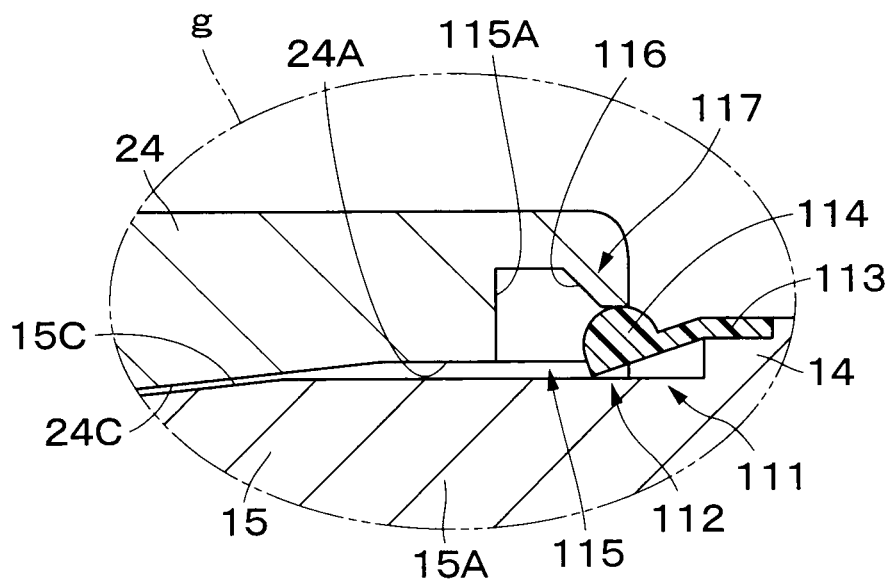
FIG. 32 is an enlarged sectional view showing the rotation restricting mechanism in the course of mounting the rotary atomizing head on the rotational shaft, taken in the same position as FIG. 31.

In the next place, as the mounting shaft section 15 is placed in the mounting tube section 24 to mount the rotary atomizing head 21 on the rotational shaft 14, the claw members 114 come to contact the opening end of the mounting tube section 24. At this time, the fore distal ends of the arm members 113 flex radially inward or toward the rotational shaft 14 as shown in FIG. 32.

Figure 31:
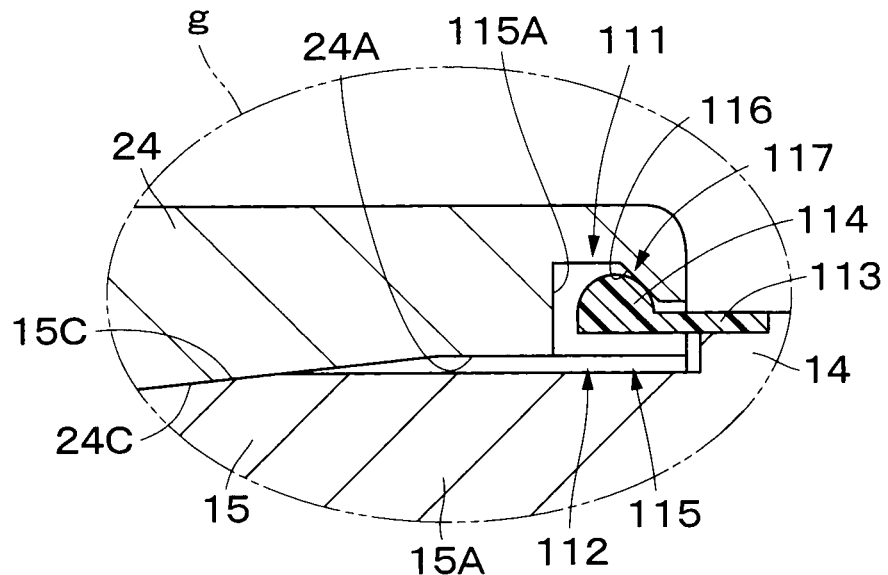
FIG. 31 is an enlarged sectional view of the rotation restricting mechanism in a demarcated area g in FIG. 29.

In this state, as the rotary atomizing head 21 is further pushed onto the rotational shaft 14, the claw members 114 intrude into the inside of the independent grooves 115A of the fitting portions 115. As a result, the arm members 113 are allowed to stretch out in the axial direction by a spring action as shown in FIG. 31.

At this time, the claw members 114 are held in engagement with the fitting portions 115 in a fixed state in both axial and circumferential directions. Thus, the claw members 114 and the fitting portions 115 can restrict the displacements of the rotary atomizing head 21 in circumferential and axial directions relative to the rotational shaft 14.

In this connection, the arm members 113 are not necessarily required to have a spring action. For instance, it is possible to utilize centrifugal force to displace the fore distal ends (the claw members 114) of the arm member 113 in a radially outward direction.

The independent grooves 115A of the fitting portions 115 are provided in a greater number as compared with the claw members 114. Therefore, the claw members 114 can fall into engagement with any one of independent grooves 115A which happen to be in confronting positions. Accordingly, the claw members 114 can be easily brought to positions which are confronted by the independent grooves 115A, making it possible to mount the rotary atomizing head 21 in position in an efficient manner.

Denoted at 117 is an axial aligning mechanism which is constituted integrally with the rotation restricting mechanism 111 and the axial displacement restricting mechanism 112.

In this instance, the axial aligning mechanism 117 is arranged in the manner as follows. An inclined surface (inclined wall surface) 116 which is formed in such a way that the groove depth gets shallower gradually from a deepest portion toward an opening side of the mounting tube section 24 is provided at an inner side of each independent groove 115A. In this instance, the inclined surface 116 is arranged to come into contact with a fore distal end portion of a claw member 114. Thus, the claw members 114 and the inclined surfaces 116 of the respective independent grooves 115A constitute the axial aligning mechanism 117 which brings a center axis of the rotary atomizing head 21 into alignment with a center axis of the rotational shaft 14.

More particularly, when the rotational shaft 14 is put in high speed rotation, the claw members 114 are displaced in a radially outward direction under the influence of centrifugal force to let fore distal end portions of the respective claw members 114 contact the inclined surfaces 116. At this time, the claw members 114 are caught in the independent grooves 115A to pull the rotary atomizing head 21 in a direction toward base ends of the respective arm members 113. As a result, the inclined inner peripheral surface 24C of the rotary atomizing head 21 is biased toward the inclined outer peripheral surface 15C of the rotational shaft 14 to automatically bring the rotary atomizing head 21 coaxially into alignment with the rotational shaft 14.

Thus, the above-described tenth embodiment can obtain substantially the same operational effects as the foregoing first, fifth and ninth embodiments. Especially in the case of the tenth embodiment, the axial aligning mechanism 117 is constituted by the inclined surfaces 116 which are provided within the respective independent grooves 115A. Accordingly, as the claw members 114 are displaced radially outward under the influence of centrifugal force, fore distal ends of the claw members 114 are abutted against the inclined surfaces 116 of the independent grooves 115A, pulling the rotary atomizing head 21 toward the rotational shaft 14. As a result, the inclined inner peripheral surface 24C of the rotary atomizing head 21 is biased toward the inclined outer peripheral surface 15C of the rotational shaft 14 to bring the center axis of the rotary atomizing head 21 automatically into alignment with the center axis of the rotational shaft 14.

In the third embodiment shown in FIG. 8, a first magnetic ring 45 with magnetic force is employed in combination with a second magnetic ring 46 without magnetic force. However, the present invention is not limited to this particular example. For instance, it is possible to employ a first magnetic ring 45 without magnetic force in combination with a second magnetic ring 46 with magnetic force. Both of first and second magnetic rings 45 and 46 may have magnetic force as long as the two rings 45, 46 are magnetically attracted toward each other. This arrangement can be applied to the fourth and seventh embodiments and to the second and fourth modifications as well.

In the fifth embodiment shown in FIGS. 10 to 13, a couple of coupling projections 65 are provided on a rotational shaft 14. However, the present invention is not limited to this particular example shown. For instance, only one or three or more coupling projections may be provided on the rotational shaft if desired. In the latter case, it is desirable to provide a plural number of coupling projections at uniform intervals in the circumferential direction in consideration of the balance of rotation of the rotary atomizing head. This arrangement can be applied to the sixth to ninth embodiments and to the first to fourth modifications as well. Further, in the ninth embodiment shown in FIGS. 23 to 26, independent grooves 105A are provided in a greater number as compared with the coupling projections 103. However, if desired, the independent grooves 105A may be provided in the same number as the coupling projections of the fitting portions. This arrangement can be applied to the tenth embodiment and to the third and fourth modifications as well.

Further, in the first embodiment, by way of example the rotary atomizing head 21 is applied to a cartridge type rotary atomizing head type coating device 1 to which a cartridge 9 replenished with a paint of each color is replaceably attached. However, the present invention is not limited to the particular example shown. For instance, the invention can be similarly applied to a rotary atomizing head type coating device having a feed tube connected to an external paint supply source, and the like. This arrangement can be applied to other embodiments and modifications described above.

Furthermore, in the first embodiment, by way of example a high voltage generator which is not shown in the drawings is provided, and a high voltage is directly applied to paint by the high voltage generator. However, the present invention is not limited to this particular example shown. For instance, the invention can be similarly applied to an indirectly charging type rotary atomizing head type coating device which is provided with an external electrode on the outer peripheral side of the housing, and adapted to indirectly charge sprayed paint from the rotary atomizing head with a high voltage by the use of the external electrode. This arrangement can be applied to other embodiments and modifications of the invention.

The invention claimed is:

1. A rotary atomizing head type coating device comprising:
a rotational shaft adapted to be put in rotation by a motor and provided with a mounting shaft section at a fore distal end thereof, and a rotary atomizing head whose front portion is formed in a bell- or cup-shape and whose rear portion is a mounting tube section mounted on an outer peripheral side of said mounting shaft section of said rotational shaft, wherein:
a rotation restricting mechanism which is adapted to restrict rotational movements of said rotary atomizing head in the rotational direction relative to said rotational shaft is provided between said mounting shaft section of said rotational shaft and said mounting tube section of said rotary atomizing head; and
said rotation restricting mechanism is constituted by a male spline comprised of a plural number of spline teeth provided on the outer peripheral side of said mounting shaft section of said rotational shaft and extending in the axial direction in parallel relation with a longitudinal axis O-O of said rotational shaft, and a female spline comprised of a plural number of spline teeth provided on the inner peripheral side of said mounting tube section of said rotary atomizing head and extending in the axial direction in parallel relation with a longitudinal axis O-O of said rotational shaft for meshing engagement with said spline teeth,
an axial displacement restricting mechanism, which is adapted to restrict displacements of said rotary atomizing head in the axial direction relative to said rotational shaft, is provided between said mounting shaft section of said rotational shaft and said mounting tube section of said rotary atomizing head,
said axial displacement restricting mechanism is constituted by radially and outwardly displaceable coupling members provided on the outer peripheral side of said mounting shaft section of said rotational shaft, and a circumferentially extending fitting groove provided on the inner peripheral side of said mounting tube section of said rotary atomizing head in such a way as to permit intrusion and fitting of said coupling members,
an axial aligning mechanism, which is adapted to push an inner peripheral surface of said rotary atomizing head against an outer peripheral surface of said rotational shaft to bring a center axis of said rotary atomizing head into alignment with a center axis of said rotational shall when said rotary atomizing head is put in rotation, is provided between said mounting shaft section of said rotational shaft and said mounting tube section of said rotary atomizing head, and
said axial aligning mechanism is constituted by an inclined bottom surface provided at the bottom portion of said fitting groove in such a way that the groove depth gets shallower gradually from a deepest portion toward an opening side of said mounting tube section.

2. A rotary atomizing head type coating device according to claim 1, wherein each of said coupling members is associated with a spring member which is adapted to bias in a radially outward direction.

3. A rotary atomizing head type coating device according to claim 1, wherein said coupling members and said fitting groove arc attracted to each other by magnetic force.

4. A rotary atomizing head type coating device according to claim 1, wherein each one of said coupling members is constituted by a coupling projection whose fore distal end is protrusibly mounted on said mounting shaft section of said rotational shaft.

5. A rotary atomizing head type coating device according to claim 1, wherein each one of said coupling members is in the form of a coupling ball which is protrusibly mounted on said mounting shaft section of said rotational shaft.

* * * * *